US012688962B2

(12) United States Patent
Yoshioka et al.

(10) Patent No.: US 12,688,962 B2
(45) Date of Patent: Jul. 21, 2026

(54) INDUCTOR COMPONENT

(71) Applicant: Murata Manufacturing Co., Ltd., Kyoto-fu (JP)

(72) Inventors: Yoshimasa Yoshioka, Nagaokakyo (JP); Ryo Kudou, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 813 days.

(21) Appl. No.: 17/410,812

(22) Filed: Aug. 24, 2021

(65) Prior Publication Data

US 2022/0068550 A1 Mar. 3, 2022

(30) Foreign Application Priority Data

Aug. 26, 2020 (JP) ................................ 2020-142765

(51) Int. Cl.
*H01F 27/28* (2006.01)
*H01F 5/00* (2006.01)
*H01F 17/00* (2006.01)

(52) U.S. Cl.
CPC ......... *H01F 27/2804* (2013.01); *H01F 5/003* (2013.01); *H01F 17/0006* (2013.01); *H01F 27/28* (2013.01)

(58) Field of Classification Search
CPC ......... H01F 17/0013; H01F 2027/2809; H01F 17/0006; H01F 27/2804; H01F 5/003; H01F 27/29; H01F 27/292; H01F 27/28
USPC .................................................. 336/200, 232
See application file for complete search history.

(56) References Cited

U.S. PATENT DOCUMENTS

| | | | | |
|---|---|---|---|---|
| 6,191,667 | B1 * | 2/2001 | Takenaka | H01F 17/0006 336/232 |
| 2018/0075965 | A1 * | 3/2018 | Yoshioka | H01F 27/2823 |
| 2019/0244743 | A1 * | 8/2019 | Hirai | H01F 41/12 |
| 2020/0027638 | A1 * | 1/2020 | Taguchi | H01F 27/292 |
| 2020/0027645 | A1 * | 1/2020 | Yoshioka | H01F 27/323 |
| 2020/0027646 | A1 * | 1/2020 | Hamada | H01F 27/323 |
| 2020/0098506 | A1 * | 3/2020 | Hamada | H01F 27/32 |

(Continued)

FOREIGN PATENT DOCUMENTS

| | | | |
|---|---|---|---|
| JP | 2017216773 A * | 12/2017 | H01F 17/04 |
| JP | 2019121780 A * | 7/2019 | |

(Continued)

*Primary Examiner* — Tszfung J Chan
(74) *Attorney, Agent, or Firm* — Studebaker Brackett PLLC

(57) ABSTRACT

An inductor component includes a rectangular parallelepiped element body inside which a inductor wire extends in the first layer. The inductor wire includes a wiring body extending linearly, and first and second pads at first and second ends, respectively, of the wiring body. Of the surface of the element body, the dimension of the upper main face in the thickness direction in the longitudinal direction is 2.5 times or more the dimension of the main face in the short direction. When viewed from the thickness direction, the smallest rectangular region that is divided by a long side extending in the longitudinal direction and a short side extending in the short direction and that surrounds the whole wiring body is defined as an inductor region. The dimension of the first side of the inductor region is three times or more the dimension of the second side of the inductor region.

22 Claims, 16 Drawing Sheets

(56) References Cited

U.S. PATENT DOCUMENTS

| | | | | |
|---|---|---|---|---|
| 2020/0105457 | A1* | 4/2020 | Yasuda | H01F 27/29 |
| 2020/0128675 | A1* | 4/2020 | Matsumoto | H05K 3/4658 |
| 2020/0176170 | A1* | 6/2020 | Terauchi | H01F 27/2804 |
| 2020/0312513 | A1* | 10/2020 | Ishiwata | C23C 24/02 |
| 2020/0312519 | A1* | 10/2020 | Sasajima | H01F 27/06 |
| 2020/0312520 | A1* | 10/2020 | Sasajima | H01F 41/04 |
| 2021/0020326 | A1* | 1/2021 | Sasajima | H01B 1/22 |
| 2021/0043367 | A1* | 2/2021 | Yoshioka | H01F 27/2828 |
| 2021/0065952 | A1* | 3/2021 | Otani | H01F 41/10 |
| 2021/0065964 | A1* | 3/2021 | Otani | H01F 41/046 |
| 2021/0074467 | A1* | 3/2021 | Tominaga | H01F 17/0013 |
| 2021/0104354 | A1* | 4/2021 | Yoshioka | H01F 27/324 |
| 2021/0125769 | A1* | 4/2021 | Yoshioka | H01F 27/32 |
| 2021/0125776 | A1* | 4/2021 | Yoshioka | H01F 27/292 |
| 2021/0134516 | A1* | 5/2021 | Yoshioka | H01F 27/2804 |
| 2022/0020524 | A1* | 1/2022 | Otani | H01F 27/255 |
| 2022/0020526 | A1* | 1/2022 | Otani | H01F 27/292 |
| 2022/0059282 | A1* | 2/2022 | Yoshioka | H01F 41/041 |

FOREIGN PATENT DOCUMENTS

| | | | | |
|---|---|---|---|---|
| JP | 2019176109 A | * | 10/2019 | H01F 27/2804 |
| JP | 2020-053636 A | | 4/2020 | |

* cited by examiner

INDUCTOR COMPONENT

CROSS-REFERENCE TO RELATED APPLICATION

This application claims benefit of priority to Japanese Patent Application No. 2020-142765, filed Aug. 26, 2020, the entire content of which is incorporated herein by reference.

BACKGROUND

Technical Field

The present disclosure relates to an inductor component.

Background Art

The inductor component described in Japanese Patent Application Laid-Open No. 2020-053636 includes an element body having a main face. In the element body, the inductor wire extends spirally in a direction along the main face. When viewed from a direction orthogonal to the main face, the element body has a quadrangular shape, and has a side extending in the longitudinal direction and a side extending in the width direction. The dimension in the longitudinal direction and the dimension in the width direction of the element body are substantially the same.

SUMMARY

For example, in an inductor component requiring a large current such as a power inductor, when DC electric resistance is prioritized over an inductance value, the inductor wire may have a linear shape or a meander shape. However, in the inductor component described in Japanese Patent Application Laid-Open No. 2020-053636, there is a limit in disposing linear or meander inductor wire to increase the wiring length while suppressing an increase in DC electric resistance.

An aspect of the present disclosure is an inductor component including a rectangular parallelepiped element body having a rectangular main face, an inductor wire that extends in parallel with the main face inside the element body and whose number of turns is 0.5 turns or less, and a first vertical wire and a second vertical wire extending from the inductor wire in a thickness direction orthogonal to the main face and exposed from the main face. When a direction parallel to a long side of the main face is defined as a first direction, and a direction parallel to the main face and orthogonal to the first direction is defined as a second direction, the inductor wire includes a wiring body having a first end and a second end. The first end is positioned closer to one side in the first direction than the second end, a first pad is provided at the first end of the wiring body and connected to the first vertical wire, and a second pad is provided at the second end of the wiring body and connected to the second vertical wire. When a smallest rectangular region surrounding the whole wiring body when viewed from the thickness direction with a first side parallel to the first direction and a second side parallel to the second direction is defined as an inductor region, a dimension of the main face in the first direction is 2.5 times or more a dimension of the main face in the second direction, and a dimension of the first side is 3 times or more a dimension of the second side.

An aspect of the present disclosure is an inductor component including a rectangular parallelepiped element body having a rectangular main face, a plurality of inductor wires that extends in parallel with the main face inside the element body and whose number of turns is 0.5 turns or less, and a first vertical wire and a second vertical wire extending from each of the inductor wires in a thickness direction orthogonal to the main face and exposed from the main face. When a direction parallel to one side of the main face is defined as a first direction, and a direction parallel to the main face and orthogonal to the first direction is defined as a second direction, each of the inductor wire includes a wiring body having a first end and a second end. The first end is positioned closer to one side in the first direction than the second end, a first pad is provided at the first end of the wiring body and connected to the first vertical wire, and a second pad is provided at the second end of the wiring body and connected to the second vertical wire. When N and M are positive integers, and at least one of N and M is a positive integer of 2 or more, the inductor wires are away from each other on an identical plane, and M rows of the inductor wires are provided in the second direction, the N inductor wires are disposed in the first direction in the one row. When the main face is imaginarily divided into N ranges at equal intervals in the first direction and is imaginarily divided into M ranges at equal intervals in the second direction, the one inductor wire is disposed in one range when viewed from the thickness direction. When a smallest rectangular region surrounding the one whole wiring body with a first side parallel to the first direction and a second side parallel to the second direction when viewed from the thickness direction is defined as an inductor region, a dimension of the first side is three times or more a dimension of the second side in at least one of the inductor regions, and wherein a value obtained by dividing a dimension of the main face in the first direction by N is 2.5 times or more a value obtained by dividing a dimension of the main face in the second direction by M.

According to each of the above configurations, the element body is correspondingly long in the first direction. Therefore, it is possible to ensure that the inductor region is long in the first direction. Therefore, the wiring length of the wiring body of the inductor wire can be sufficiently secured.

The wiring length of the inductor wire can be sufficiently secured.

DETAILED DESCRIPTION

First Embodiment

Figure 1:
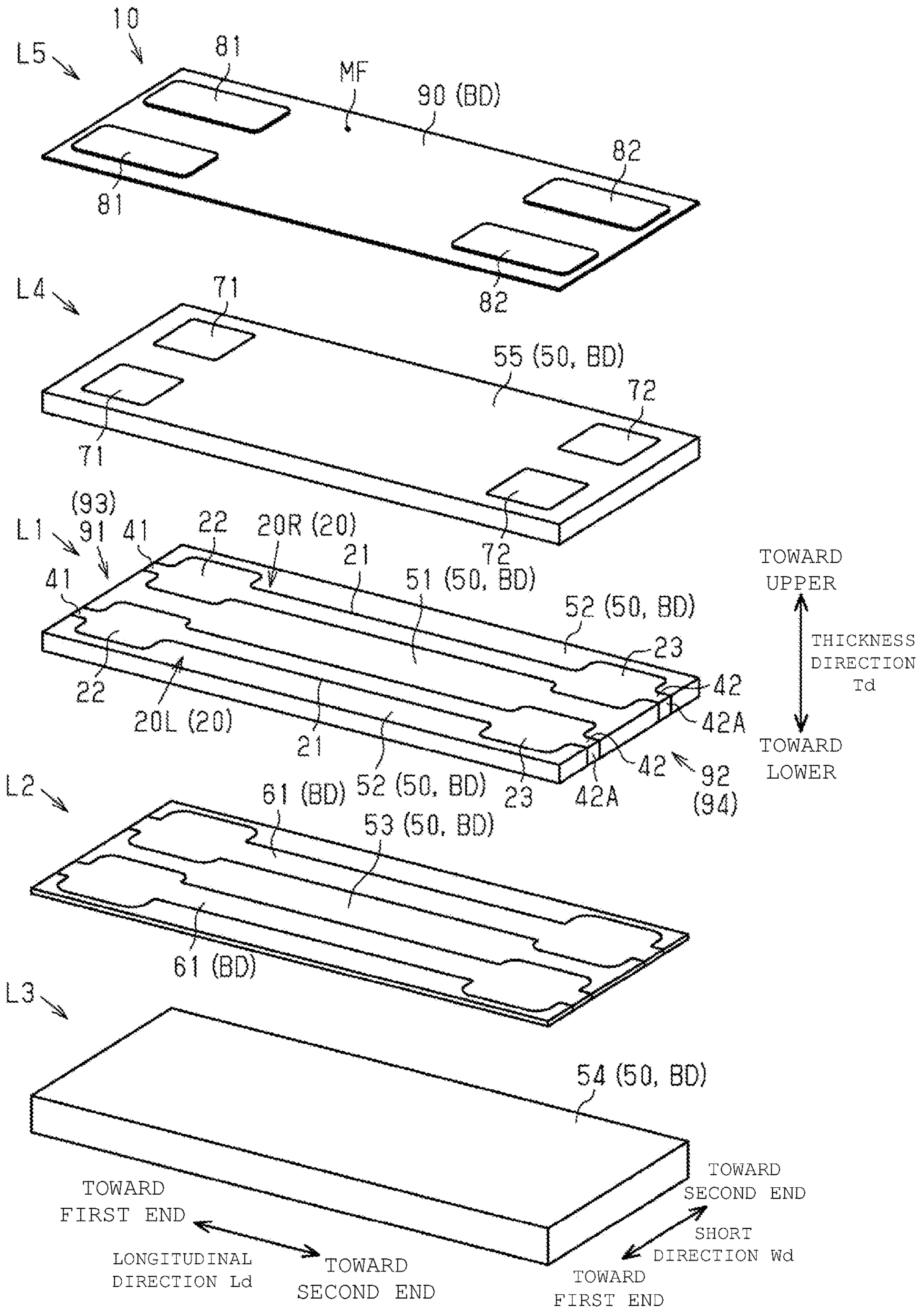
FIG. 1 is an exploded perspective view of an inductor component according to the first embodiment.

Hereinafter, a first embodiment of an inductor component will be described. In the drawings, components may be illustrated in an enlarged manner for easy understanding. The dimension ratios of the components may be different from the actual ones or those in another figure.

As illustrated in FIG. 1, an inductor component 10 has a structure in which five layers are laminated in a thickness direction Td as a whole. In the following description, one side in the thickness direction Td is an upper side, and the opposite side is a lower side.

A first layer L1 includes two inductor wires 20, a first support wire 41 and a second support wire 42 extending from each of the inductor wires 20, an inner magnetic path portion 51, and an outer magnetic path portion 52. In the following description, when it is necessary to distinguish the two inductor wires 20, one inductor wire 20 is referred to as a first inductor wire 20R, and the other inductor wire 20 is referred to as a second inductor wire 20L.

The first layer L1 has a rectangular shape when viewed from the thickness direction Td. A direction parallel to the long side of the rectangular shape is defined as a longitudinal direction Ld, and a direction parallel to the short side is defined as a short direction Wd.

The inductor wire 20 includes a wiring body 21 extending linearly, and a first pad 22 and a second pad 23 each of which is provided at an end of the wiring body 21.

The wiring body 21 extends in the longitudinal direction Ld of the first layer L1. Therefore, the first end of the wiring body 21 is located closer to the first end in the longitudinal direction Ld than the second end of the wiring body 21. The first pad 22 is connected to the first end, of the wiring body 21, toward the first end in the longitudinal direction Ld. The first end, of the wiring body 21, toward the first end in the longitudinal direction Ld may be enlarged so as to be wider than the central portion of the wiring body 21 in the longitudinal direction Ld.

The dimension of the first pad 22 in the short direction Wd is larger than the dimension of the wiring body 21 in the short direction Wd. The first pad 22 has a substantially square shape when viewed from the thickness direction Td.

The second pad 23 is connected to the second end, of the wiring body 21, toward the second end in the longitudinal direction Ld. The second end, of the wiring body 21, toward the second end in the longitudinal direction Ld may be enlarged so as to be wider than the central portion of the wiring body 21 in the longitudinal direction Ld.

The dimension of the second pad 23 in the short direction Wd is larger than the dimension of the wiring body 21 in the short direction Wd. The second pad 23 has substantially the same square shape as the first pad 22 when viewed from the thickness direction Td.

The inductor wire 20 is made of a conductive material. In the present embodiment, the composition of the inductor wire 20 can be made of copper with a ratio of 99 wt % or more and sulfur with ratio of 0.1 wt % or more and 1.0 wt % or less (i.e., from 0.1 wt % to 1.0 wt %).

In the first layer L1, the first support wire 41 extends from a portion, of the first pad 22, away from the wiring body 21. That is, the first support wire 41 extends from the edge, of the first pad 22, toward the first end in the longitudinal direction Ld. The first support wire 41 extends linearly in parallel with the longitudinal direction Ld. The first support wire 41 extends to a first side face 91, of the first layer L1, toward the first end in the longitudinal direction Ld and is exposed from the first side face 91. There are two first support wires 41 whose number corresponds to the number of the inductor wires 20, and both the two first support wires 41 are exposed from the first side face 91.

Similarly, in the first layer L1, the second support wire 42 extends from a portion, of the second pad 23, away from the wiring body 21. That is, the second support wire 42 extends from the edge, of the second pad 23, toward the second end in the longitudinal direction Ld. The second support wire 42 extends linearly in parallel with the longitudinal direction Ld. The second support wire 42 extends to a second side face 92, of the first layer L1, toward the second end in the longitudinal direction Ld and is exposed from the second side face 92. There are two second support wires 42 whose number corresponds to the number of the inductor wires 20, and both the two second support wires 42 are exposed from the second side face 92.

The first support wire 41 and the second support wire 42 are made of the same conductive material as the inductor wire 20. However, part, of the first support wire 41, including an exposed face 41A exposed from the first side face 91 is made of a Cu oxide. Similarly, part, of the second support wire 42, including an exposed face 42A exposed from the second side face 92 is made of a Cu oxide.

Figure 2:
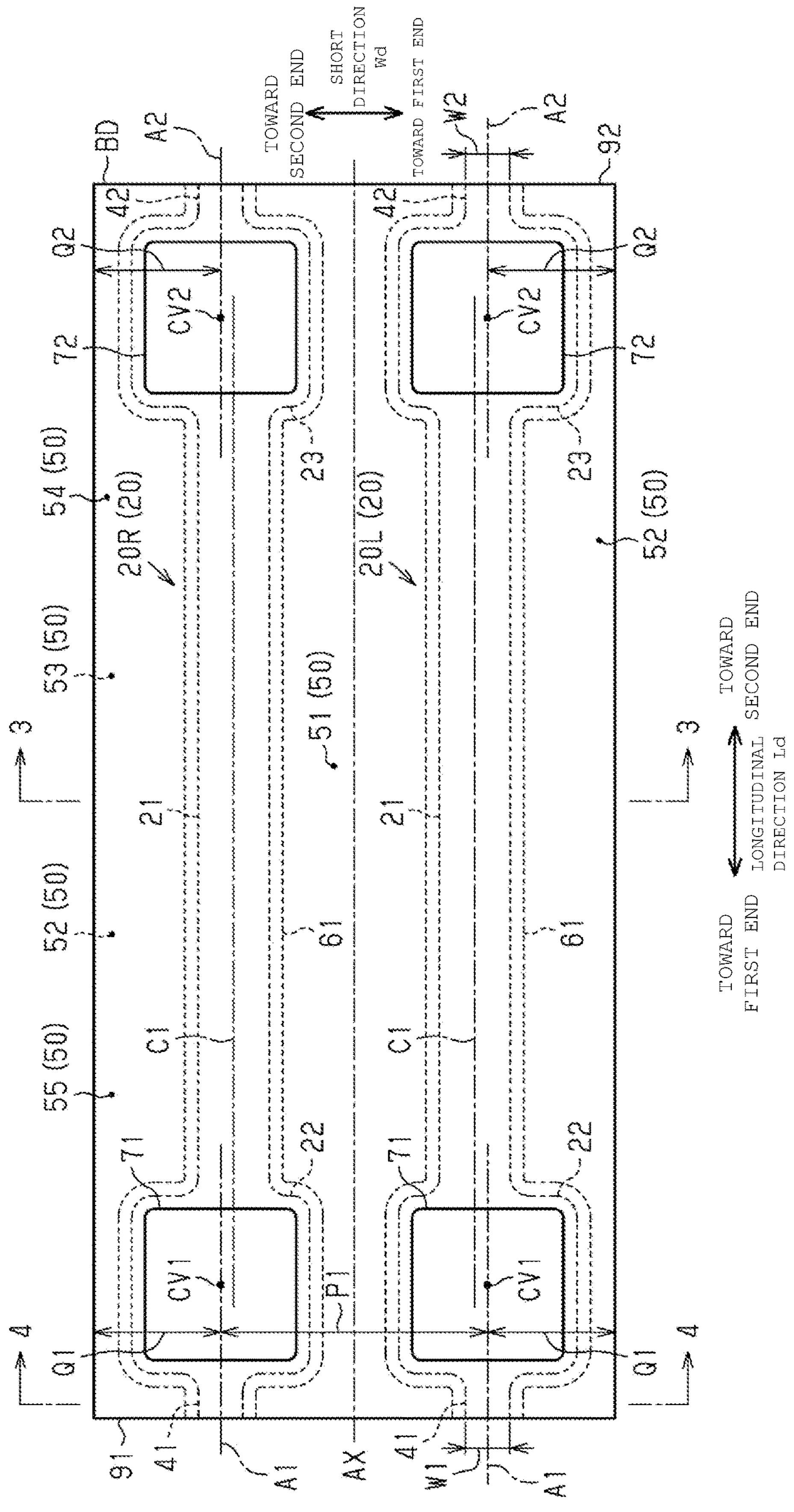
FIG. 2 is a transparent top view of the inductor component according to the first embodiment excluding a fifth layer.

As illustrated in FIG. 2, when a straight line passing through the center of the first layer L1 in the short direction Wd and extending in the longitudinal direction Ld is defined as a symmetry axis AX, the two inductor wires 20, and the first support wire 41 and the second support wire 42 extending from each of the inductor wires are disposed in line symmetry with respect to the symmetry axis AX. That is, the two inductor wires 20 exist on the same plane. In the embodiment, the first support wire 41 extending from the first inductor wire 20R and the second support wire 42 extending from the first inductor wire 20R are located closer to the second end in the short direction Wd than the symmetry axis AX. The first support wire 41 extending from the second inductor wire 20L and the second support wire 42 extending from the second inductor wire 20L are located toward the first end in the short direction Wd relative to the symmetry axis AX.

As described above, the two wires, the first inductor wire 20R and the second inductor wire 20L, are provided away from each other in the short direction Wd in the first layer L1. When the first layer L1 is imaginarily divided into two ranges at equal intervals in the short direction Wd, the first inductor wire 20R is disposed in a range toward the first end in the short direction Wd. Further, the second inductor wire 20L is disposed in a range toward the second end in the short direction Wd. Therefore, when the first layer L1 is imaginarily divided into two ranges at equal intervals in the short direction Wd, one inductor wire 20 is disposed in one range.

As illustrated in FIG. 1, in the first layer L1, a region between the first inductor wire 20R and the second inductor wire 20L is the inner magnetic path portion 51. The inner magnetic path portion 51 is made of magnetic material. Specifically, the material of the inner magnetic path portion 51 is a containing a metal magnetic powder. In the embodiment, the metal magnetic powder is an organic resin containing a metal magnetic powder made of an Fe-based alloy or an amorphous alloy. More specifically, the metal magnetic powder is an FeSiCr-based metal powder containing iron. In addition, the average grain diameter of the metal magnetic powder can be about 5 micrometers.

In the embodiment, the grain diameter of the metal magnetic powder is the longest length, among line segments, drawn from an edge to an edge of a sectional shape of the metal magnetic powder appearing in a cross section when cutting the inner magnetic path portion 51. The average grain diameter is an average of grain diameters of the metal magnetic powder at random three or more points among the metal magnetic powder appearing in a cross section when cutting the inner magnetic path portion 51.

In the first layer L1, when viewed from the thickness direction Td, a region toward the second end in the short direction Wd relative to the first inductor wire 20R and a region toward the first end in the short direction Wd relative to the second inductor wire 20L are the outer magnetic path portion 52. The outer magnetic path portion 52 is made of the same magnetic material as the inner magnetic path portion 51.

In the present embodiment, the dimension of the first layer L1 in the thickness direction Td, that is, the dimension of each of the inductor wire 20, the first support wire 41, and the second support wire 42 in the thickness direction Td can be approximately 40 micrometers.

When viewed from the thickness direction Td, a second layer L2 having the same rectangular shape as the first layer L1 is laminated on a lower face which is a lower face of the first layer L1 in the thickness direction Td. The second layer L2 includes two insulation resins 61 and an insulation resin magnetic layer 53.

The insulation resins 61 cover the lower faces of the inductor wires 20, the first support wire 41, and the second support wire 42 in the thickness direction Td. When viewed from the thickness direction Td, the insulation resin 61 has a shape that covers a range slightly wider than the outer edges of the inductor wires 20, the first support wire 41, and the second support wire 42. As a result, the insulation resin 61 has a band shape extending in the longitudinal direction Ld of the second layer L2 as a whole. The material of the insulation resin 61 is an insulation resin, and in the embodiment, for example, can be a polyimide-based resin. The insulation resin 61 has higher insulating properties than the inductor wire 20. The two insulation resins 61 are provided side by side in the short direction Wd corresponding to the number and arrangement of the inductor wires 20.

In the second layer L2, a portion excluding the two insulation resins 61 is the insulation resin magnetic layer 53. The insulation resin magnetic layer 53 is made of the same magnetic material as the inner magnetic path portion 51 and the outer magnetic path portion 52 described above.

When viewed from the thickness direction Td, a third layer L3 having the same rectangular shape as the second layer L2 is laminated on a lower face which is a lower face of the second layer L2 in the thickness direction Td. The third layer L3 is a first magnetic layer 54. Therefore, the first magnetic layer 54 is disposed below the inductor wire 20. The first magnetic layer 54 is made of an organic resin containing the metal magnetic powder same as that of the inner magnetic path portion 51, the outer magnetic path portion 52, and the insulation resin magnetic layer 53 described above.

On the other hand, when viewed from the thickness direction Td, a fourth layer L4 having the same rectangular shape as the first layer L1 is laminated on an upper face which is an upper face of the first layer L1 in the thickness direction Td. The fourth layer L4 includes two first vertical wires 71, two second vertical wires 72, and a second magnetic layer 55.

The first vertical wire 71 is directly connected to the upper face of the first pad 22 in the inductor wire 20 without another layer interposed therebetween. That is, the first vertical wire 71, the first end of the wiring body 21, and the first support wire 41 are connected to the first pad 22.

The first vertical wire 71 is made of the same material as the inductor wire 20. The first vertical wire 71 has a regular square pole shape, and the axial direction of the regular square pole coincides with the thickness direction Td.

As illustrated in FIG. 2, when viewed from the thickness direction Td, the dimension of each side of the square-shaped first vertical wire 71 is slightly smaller than the dimension of each side of the square-shaped first pad 22. Therefore, the area of the first pad 22 is larger than the area of the first vertical wire 71 at the connection point with the first pad 22. When viewed from above in the thickness direction Td, a central axis line CV1 of the first vertical wire 71 coincides with the geometric center of the substantially square first pad 22. Two first vertical wires 71 are provided corresponding to the number of the inductor wires 20.

As illustrated in FIG. 1, the second vertical wire 72 is directly connected to the upper face of the second pad 23 in the inductor wire 20 without another layer interposed therebetween. That is, the second vertical wire 72, the second end of the wiring body 21, and the second support wire 42 are connected to the second pad 23.

The second vertical wire 72 is made of the same material as the inductor wire 20. The second vertical wire 72 has a regular square pole shape, and the axial direction of the regular square pole coincides with the thickness direction Td.

As illustrated in FIG. 2, when viewed from the thickness direction Td, the dimension of each side of the square-shaped second vertical wire 72 is slightly smaller than the dimension of each side of the square-shaped second pad 23. Therefore, the area of the second pad 23 is larger than the area of the second vertical wire 72 at the connection point with the second pad 23. When viewed from above in the thickness direction Td, a central axis line CV2 of the second vertical wire 72 coincides with the geometric center of the substantially square second pad 23. The two second vertical wires 72 are provided corresponding to the number of the inductor wires 20.

As illustrated in FIG. 1, a portion, of the fourth layer L4, excluding the two first vertical wires 71 and the two second vertical wires 72 is the second magnetic layer 55. Therefore, the second magnetic layer 55 is laminated on the upper faces of the inductor wires 20 and the support wires 41 and 42. That is, the support wires 41 and 42 are in direct contact with the second magnetic layer 55. The second magnetic layer 55 is made of the same magnetic material as the first magnetic layer 54 described above.

In the inductor component 10, the inner magnetic path portion 51, the outer magnetic path portion 52, the insulation resin magnetic layer 53, the first magnetic layer 54, and the second magnetic layer 55 constitute a magnetic layer 50. The inner magnetic path portion 51, the outer magnetic path portion 52, the insulation resin magnetic layer 53, the first magnetic layer 54, and the second magnetic layer 55 are connected and surround each inductor wire 20. As described above, the magnetic layer 50 has a closed magnetic circuit for each inductor wire 20. Therefore, each inductor wire 20 extends inside the magnetic layer 50. Although the inner magnetic path portion 51, the outer magnetic path portion 52, the insulation resin magnetic layer 53, the first magnetic layer 54, and the second magnetic layer 55 are illustrated separately, they are integrated as the magnetic layer 50, and the boundary thereof may not be confirmed.

When viewed from the thickness direction Td, a fifth layer L5 having the same rectangular shape as the fourth layer L4 is laminated on an upper face which is an upper face of the fourth layer L4 in the thickness direction Td. The fifth layer L5 includes two first external terminals 81, two second external terminals 82, and an insulation layer 90.

The first external terminal 81 is directly connected to the upper face of the first vertical wire 71 without another layer interposed therebetween. When viewed from the thickness direction Td, the first external terminal 81 has a rectangular shape and is located on the second magnetic layer 55. The rectangular long side of the first external terminal 81 extends in parallel with the longitudinal direction Ld of the fifth layer L5, and the short side extends in parallel with the short direction Wd of the fifth layer L5. Two first external terminals 81 are provided corresponding to the number of the inductor wires 20.

The second external terminal 82 is directly connected to the upper face of the second vertical wire 72 without another layer interposed therebetween. When viewed from the thickness direction Td, the second external terminal 82 has a rectangular shape and is located on the second magnetic layer 55. The rectangular long side of the second external terminal 82 extends in parallel with the longitudinal direction Ld of the fifth layer L5, and the short side extends in parallel with the short direction Wd of the fifth layer L5.

In the fifth layer L5, a portion excluding the two first external terminals 81 and the two second external terminals 82 is the insulation layer 90. In other words, a range of a portion, of the upper face of the fourth layer L4, that is not covered with the two first external terminals 81 and the two second external terminals 82 is covered with the insulation layer 90 of the fifth layer L5. The insulation layer 90 has higher insulating properties than the magnetic layer 50, and in the present embodiment, the insulation layer 90 is a solder resist. The dimension of the insulation layer 90 in the thickness direction Td is smaller than the dimension of any of the first external terminal 81 and the second external terminal 82 in the thickness direction Td.

In the present embodiment, the magnetic layer 50, the insulation resin 61, and the insulation layer 90 constitute an element body BD. Therefore, the element body BD has a rectangular parallelepiped shape. In the present embodiment, the dimension of the element body BD in the thickness direction Td is, for example, about 0.2 mm. The element body BD is a portion, of the inductor component 10, excluding conductive wires and terminals and is a portion having insulating properties. In addition, as described above, the element body BD has a rectangular parallelepiped shape, and does not include a protruding member in part. When the shape of the element body BD is a rectangular parallelepiped shape, the laminated portion is included in the element body BD.

Of the surface of the element body BD, an upper face of the insulation layer 90 in the thickness direction Td is a main face MF. Therefore, the inductor wire 20 extends in parallel with the main face MF of the element body BD. The first vertical wire 71 extends in the thickness direction Td from the first pad 22 of the inductor wire 20 toward the main face MF. The first vertical wire 71 is exposed from the main face MF. The second vertical wire 72 extends in the thickness direction Td from the second pad 23 of the inductor wire 20 toward the main face MF. The second vertical wire 72 is exposed from the main face MF. As in the present embodiment, at least part of the respective faces, of the first vertical wire 71 and the second vertical wire 72, exposed from the main face MF may be covered with the first external terminal 81 and the second external terminal 82, respectively.

The element body BD has a first side face 93 perpendicular to the main face MF. The first side face 91 of the first layer L1 is part of the first side face 93 of the element body BD. The element body BD has a second side face 94 which is a side face perpendicular to the main face MF and is parallel to the first side face 93. The second side face 92 of the first layer L1 is part of the second side face 94 of the element body BD. That is, the first support wire 41 extends from the inductor wire 20 in parallel with the main face MF, and has an end exposed from the first side face 93 of the element body BD. Similarly, the second support wire 42 extends from the inductor wire 20 in parallel with the main face MF, and has an end exposed from the second side face 94 of the element body BD.

When viewed from the thickness direction Td, the main face MF has a rectangular shape reflecting the outer edge shape of the insulation layer 90. Here, when viewed from the thickness direction Td, a direction parallel to one side of the rectangular shape is defined as a first direction, and a direction parallel to the main face MF and orthogonal to the first direction is defined as a second direction. In the present embodiment, the first direction coincides with the longitudinal direction Ld, and the second direction coincides with the short direction Wd. Therefore, the dimension of the main face MF in the first direction is larger than the dimension of the main face MF in the second direction.

Specifically, the dimension of the main face MF in the longitudinal direction Ld is, for example, 1.5 mm. The dimension of the main face MF in the short direction Wd is, for example, 0.6 mm. Therefore, the dimension of the main face MF in the longitudinal direction Ld is 2.5 times the dimension of the main face MF in the short direction Wd.

In the present embodiment, when viewed from the thickness direction Td, the two inductor wires 20 disposed side by side in the short direction Wd are each disposed in a range obtained by imaginarily dividing the main face MF into two so as to have the same dimension in the short direction Wd. The value obtained by dividing the dimension of the main face MF in the short direction Wd by "2", which is the number of the inductor wires 20 disposed side by side in the short direction Wd, is 0.3 mm. Therefore, the dimension of the main face MF in the longitudinal direction Ld is 5 times a value obtained by dividing the dimension of the main face MF in the short direction by the number of the inductor wires 20 disposed side by side in the short direction. In addition, the dimension of the element body BD in the thickness direction Td is smaller than a value obtained by dividing the dimension of the main face MF in the short direction Wd by "2", which is the number of the inductor wires 20 disposed side by side in the short direction Wd.

Next, each wire will be described in detail.

As illustrated in FIG. 2, when viewed from the thickness direction Td, the central axis lines C1 of the two wiring bodies 21 extend in the longitudinal direction Ld in parallel with each other. The central axis line C1 of the wiring body 21 is a line that traces a midpoint of the wiring body 21 in a direction orthogonal to the direction in which the wiring body 21 extends, that is, in the short direction Wd. The line width of each of the wiring bodies 21, that is, the dimension in the short direction Wd, can be 50 micrometers. In the following description, a distance between the central axis line C1 of the wiring body 21 of the first inductor wire 20R and the central axis line C1 of the wiring body 21 of the second inductor wire 20L in the short direction Wd is defined as a pitch between the wiring bodies 21. In the present embodiment, the pitch between the wiring bodies 21 is, for example, about 250 micrometers. In addition, the interval between the adjacent wiring bodies 21, that is, the distance between the first end of the wiring body 21 of the first inductor wire 20R in the short direction Wd and the second end of the wiring body 21 of the second inductor wire 20L in the short direction Wd in FIG. 2 is, for example, about 200 micrometers. In the present embodiment, the minimum interval between the adjacent inductor wires 20 is the interval between the first pads 22 and the interval between the second pads 23, and is 50 micrometers or more. For example, the interval between the first pads 22 and the interval between the second pads 23 may be approximately 110 micrometers.

The central axis line A1 of the first support wire 41 extends in the longitudinal direction Ld. The central axis line A1 of the first support wire 41 is a line that traces a midpoint of the first support wire 41 in a direction orthogonal to the direction in which the first support wire 41 extends, that is, in the short direction Wd.

The central axis line A1 of the first support wire 41 is located outward in the short direction Wd relative to the central axis line C1 of the wiring body 21. That is, the central axis line A1 of the first support wire 41 does not coincide with the central axis line C1 of the wiring body 21. Therefore, the central axis line A1 of the first support wire 41 and the central axis line C1 of the wiring body 21 are located on different straight lines. The extension line of the central axis line A1 of the first support wire 41 intersects with the central axis line CV1 of the first vertical wire 71.

The central axis line A2 of the second support wire 42 extends in the longitudinal direction Ld. The central axis line A2 of the second support wire 42 is a line that traces a midpoint of the second support wire 42 in a direction orthogonal to the direction in which the second support wire 42 extends, that is, in the short direction Wd.

The central axis line A2 of the second support wire 42 is located outward in the short direction Wd relative to the central axis line C1 of the wiring body 21. That is, the central axis line A2 of the second support wire 42 does not coincide with the central axis line C1 of the wiring body 21. Therefore, the central axis line A2 of the second support wire 42 and the central axis line C1 of the wiring body 21 are located on different straight lines. The extension line of the central axis line A2 of the second support wire 42 intersects with the central axis line CV2 of the second vertical wire 72.

The first support wire 41 and the second support wire 42 extending from the same inductor wire 20 are disposed at the same position in the short direction Wd. That is, the central axis line A1 of the first support wire 41 and the central axis line A2 of the second support wire 42 are located on the same straight line. The present application, when a deviation is within 10% based on the minimum line width of the inductor wire 20, they are regarded as being on the same straight line. Specifically, the minimum line width of the inductor wire 20 in the present embodiment can be 50 micrometers, which is the line width of the wiring body 21. Therefore, "on the same straight line" in the present embodiment is a case where the shortest distance between the two axis lines is within 5 micrometers, and "on different straight lines" is a case where the shortest distance between the two axis lines exceeds 5 micrometers.

As described above, in the first layer L1, the respective inductor wires 20, the respective first support wires 41, and the respective second support wires 42 are disposed in line symmetry with respect to the symmetry axis AX. Therefore, as illustrated in FIG. 2, a distance Q1 from the end, of the element body BD, toward the second end in the short direction Wd to the central axis line A1 of the first support wire 41 extending from the first inductor wire 20R is equal to a distance Q1 from the end, of the element body BD, toward the first end in the short direction Wd to the central axis line A1 of the first support wire 41 extending from the second inductor wire 20L.

Similarly, a distance Q2 from the end, of the element body BD, toward the second end in the short direction Wd to the central axis line A2 of the second support wire 42 extending from the first inductor wire 20R is equal to a distance Q2 from the end, of the element body BD, toward the first end in the short direction Wd to the central axis line A2 of the second support wire 42 extending from the second inductor wire 20L. Since the central axis line A1 of the first support wire 41 and the central axis line A2 of the second support wire 42 are on the same straight line, the distance Q1 and the distance Q2 are equal.

On the other hand, in the present embodiment, a pitch P1 from the central axis line A1 of the first support wire 41 in the short direction Wd extending from the first inductor wire 20R to the central axis line A1 of the first support wire 41 extending from the second inductor wire 20L is larger than the above-described distance Q1 and distance Q2. Specifically, the pitch P1 is about twice each of the distance Q1 and the distance Q2.

Figure 3:
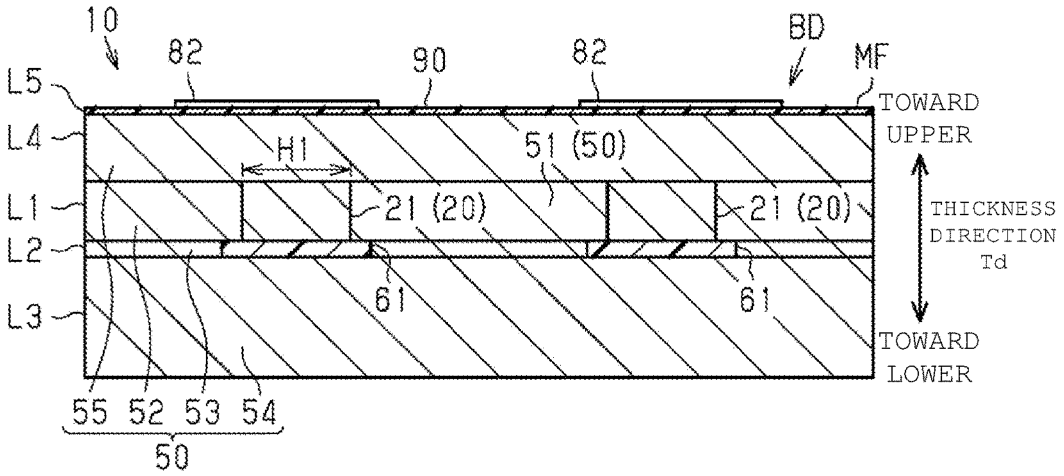
FIG. 3 is a sectional view of the inductor component taken along line 3-3 in FIG. 2.
Figure 4:
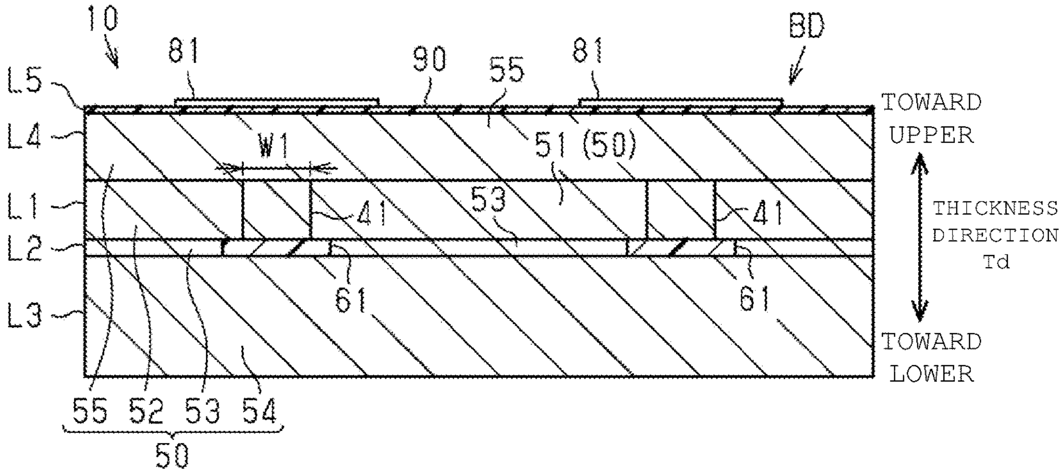
FIG. 4 is a sectional view of the inductor component taken along line 4-4 in FIG. 2.

As illustrated in FIGS. 3 and 4, a wiring width W1 of the first support wire 41 in the short direction Wd is smaller than a wiring width H1 of the wiring body 21 of the inductor wire 20 in the short direction Wd. Here, the first support wire 41 and the wiring body 21 of the inductor wire 20 are provided in the same first layer L1, and the lengths in the thickness direction Td are substantially the same. Therefore, the sectional area of each of the first support wires 41 is smaller than the sectional area of each of the wiring bodies 21 by reflecting the difference in wiring width. Similarly, as illustrated in FIGS. 2 and 3, a wiring width W2 of each second support wire 42 in the short direction Wd is smaller than the wiring width H1 of the wiring body 21 of the inductor wire 20 in the short direction Wd. Therefore, the sectional area of each of the second support wires 42 is smaller than the sectional area of each of the wiring bodies 21 by reflecting the difference in the wiring width.

Figure 5:
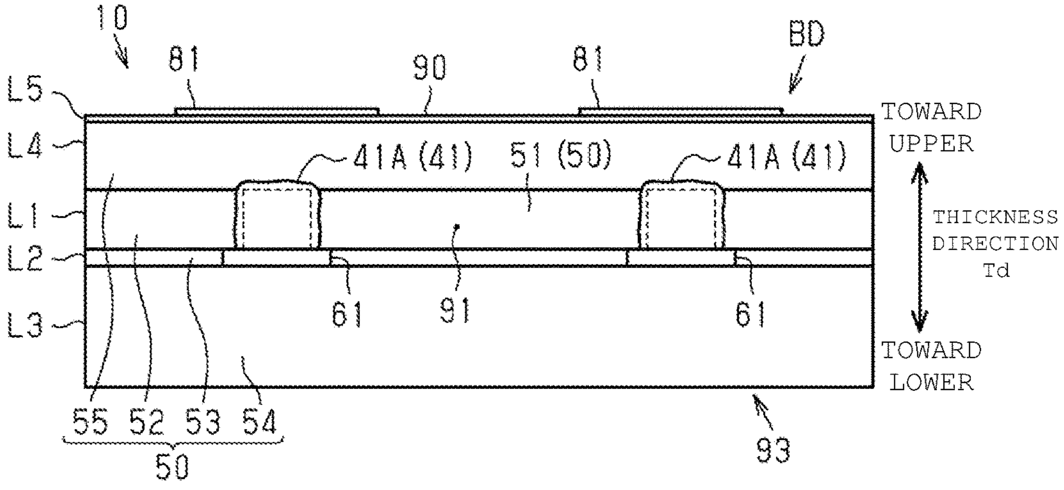
FIG. 5 is a side view illustrating a first side face of the inductor component according to the first embodiment.

As illustrated in FIG. 5, ends of the two first support wires 41 are exposed from the first side face 93, of the element body BD, toward the first end in the longitudinal direction Ld. The shape of the exposed face 41A of each first support wire 41 exposed from the first side face 93 is a shape obtained by slightly extending the sectional shape of the first support wire 41 orthogonal to the central axis line A1. As a result, the area of the exposed face 41A of the first support wire 41 is larger than the sectional area of the first support wire 41 inside the element body BD in the cross section orthogonal to the central axis line A1. Similarly, as illustrated in FIG. 1, both two second support wires 42 are exposed from the second side face 94, of the element body BD, toward the second end in the longitudinal direction Ld. The area of the exposed face 42A of the second support wire 42 exposed from the second side face 92 is larger than the sectional area of the second support wire 42 inside the element body BD in the cross section orthogonal to the central axis line A2. As a result, the contact area of the first support wire 41 with the first side face 93 of the element body BD increases, the contact area of the second support wire 42 with the second side face 94 of the element body BD increases, and the adhesion between the support wires 41 and 42 and the element body BD is improved. The magnitude of the sectional area only is required to satisfy the above relationship, and for example, the exposed face 41A may have a shape in which one side is extended and the other side is covered with the extended portion of the element body BD.

The first side face 91 of the first layer L1 is part of the side face, of the element body BD, orthogonal to the main face MF. The second side face 92 of the first layer L1 is part of the side face, of the element body BD, orthogonal to the main face MF, and is the side face parallel to the first side face 91.

Figure 6:
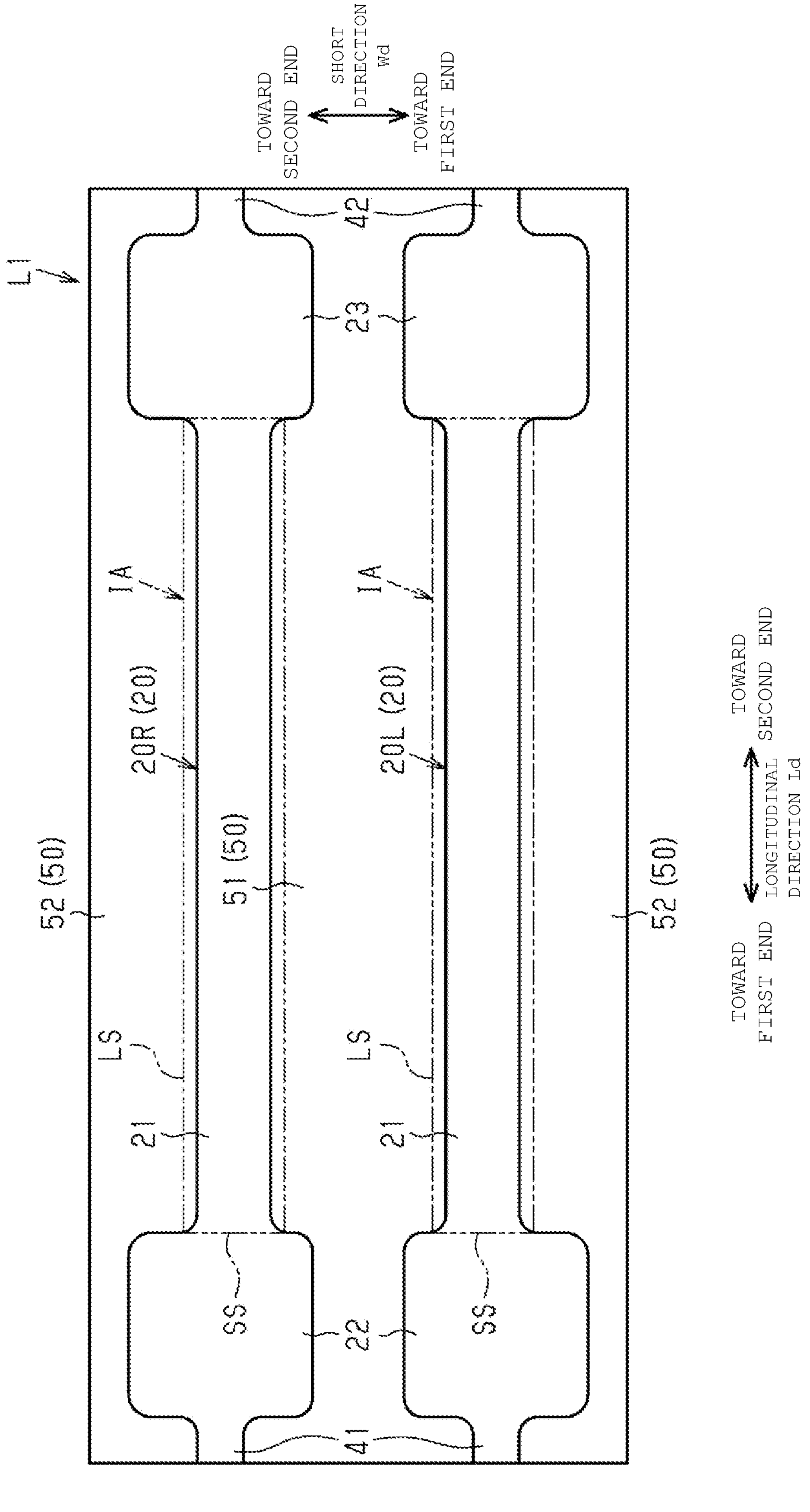
FIG. 6 is a top view of a first layer of the inductor component according to the first embodiment.

Here, when viewed from the thickness direction Td, an inductor region IA, which is the smallest region surrounding the whole wiring body 21 of the inductor wire 20, will be described in detail. As illustrated in FIG. 6, the inductor region IA is a rectangular region divided by a first side LS extending in the longitudinal direction Ld and a second side SS extending in the short direction Wd. In addition, the one inductor region IA is the smallest rectangular region surrounding the one whole wiring body 21. In the present embodiment, the dimension of the first side LS of the inductor region IA for the first inductor wire 20R is about 9 times the dimension of the second side SS of the inductor region IA. The inductor region IA for the second inductor wire 20L has the same size as the inductor region IA for the first inductor wire 20R.

When viewed from the thickness direction Td, the distance between the geometric center of the first pad 22 of the first inductor wire 20R and the geometric center of the first pad 22 of the second inductor wire 20L is equal to the pitch P1, which is about half the dimension of the element body BD in the short direction Wd. Therefore, the distance between the geometric center of the first pad 22 of the first inductor wire 20R and the geometric center of the first pad 22 of the second inductor wire 20L is one-third of the first side LS of the inductor region IA.

Next, a method of manufacturing the inductor component 10 according to the first embodiment will be described.

Figure 7:
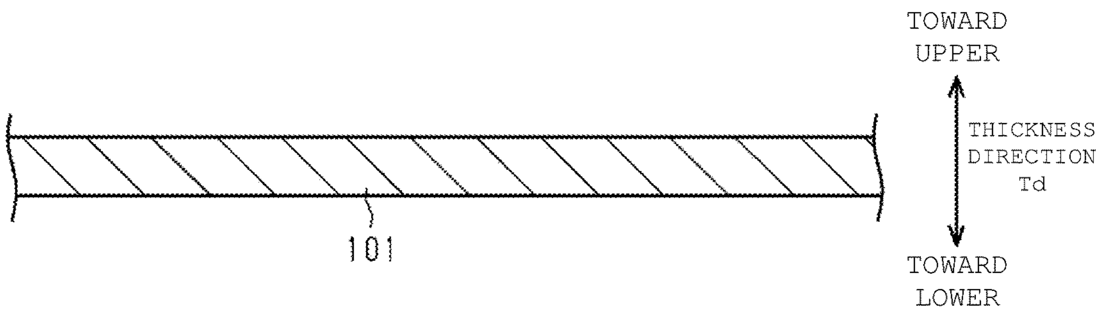
FIG. 7 is an explanatory diagram of the method of manufacturing the inductor component according to the first embodiment.

As shown in FIG. 7, first, a base member preparation step is performed. Specifically, the plate-shaped base member 101 is prepared. The base member 101 is made of ceramics. The base member 101 has a quadrangular shape when viewed from the thickness direction Td. The dimension of each side is a dimension in which a plurality of the inductor components 10 is accommodated. In the following description, a direction orthogonal to the plane direction of the base member 101 will be described as the thickness direction Td.

Figure 8:
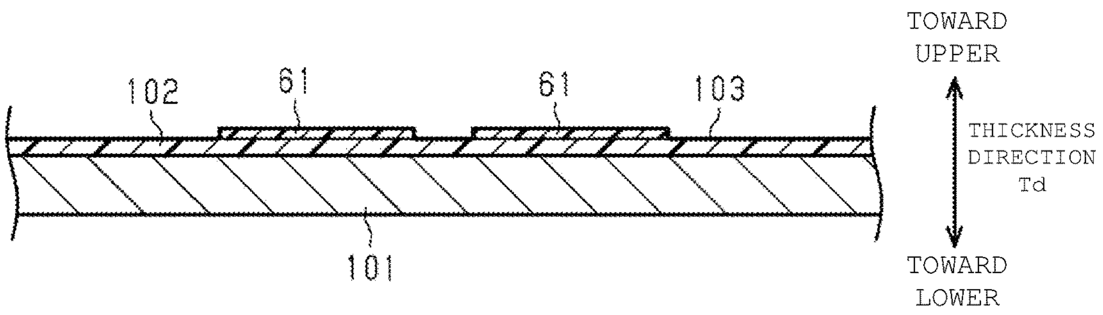
FIG. 8 is an explanatory diagram of the method of manufacturing the inductor component according to the first embodiment.

Next, as illustrated in FIG. 8, a dummy insulation layer 102 is applied to the whole upper face of the base member 101. Next, when viewed from the thickness direction Td, the insulation resin 61 is patterned by photolithography in a range slightly wider than the range in which the inductor wire 20 is disposed.

Next, a seed layer forming step of forming a seed layer 103 is performed. Specifically, the copper seed layer 103 is formed on the upper faces of the insulation resin 61 and the dummy insulation layer 102 by performing sputtering from the upper face side of the base member 101. In the drawings, the seed layer 103 is indicated by a thick line.

Figure 9:
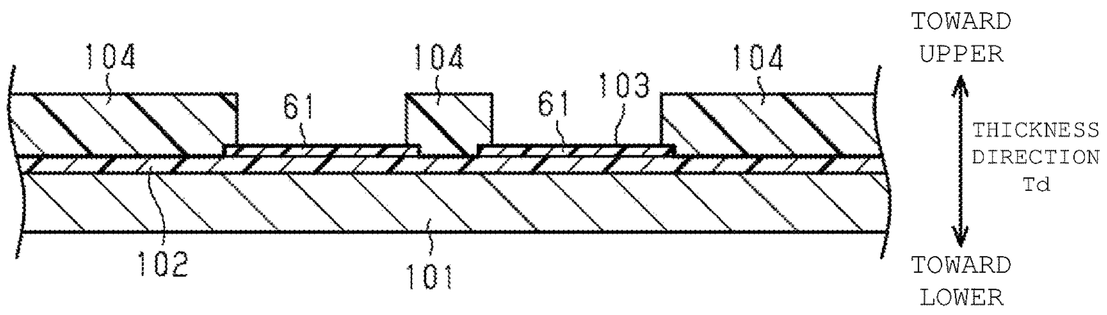
FIG. 9 is an explanatory diagram of the method of manufacturing the inductor component according to the first embodiment.

Next, as illustrated in FIG. 9, a first coating step of forming a first coating portion 104 that coats a portion, of the upper face of the seed layer 103, where the inductor wire 20, the first support wire 41, and the second support wire 42 are not formed. Specifically, first, a photosensitive dry film resist is applied to the whole upper face of the seed layer 103. Next, the whole range of the upper face of the dummy insulation layer 102 and the upper face of the outer edge portion, of the upper face of the insulation resin 61, in the range covered by the insulation resin 61 are solidified by exposure. Thereafter, an unsolidified portion of the applied dry film resist is removed with a chemical solution. As a result, a solidified portion of the applied dry film resist is formed as the first coating portion 104. On the other hand, the seed layer 103 is exposed in a portion, of the applied dry film resist, which is removed by the chemical solution and is not coated with the first coating portion 104. The thickness of the first coating portion 104, which is the dimension of the first coating portion 104 in the thickness direction Td, is slightly larger than the thickness of the inductor wire 20 of the inductor component 10 illustrated in FIG. 3. Photolithography in other steps to be described later is a similar step, and thus a detailed description thereof will be omitted.

Figure 10:
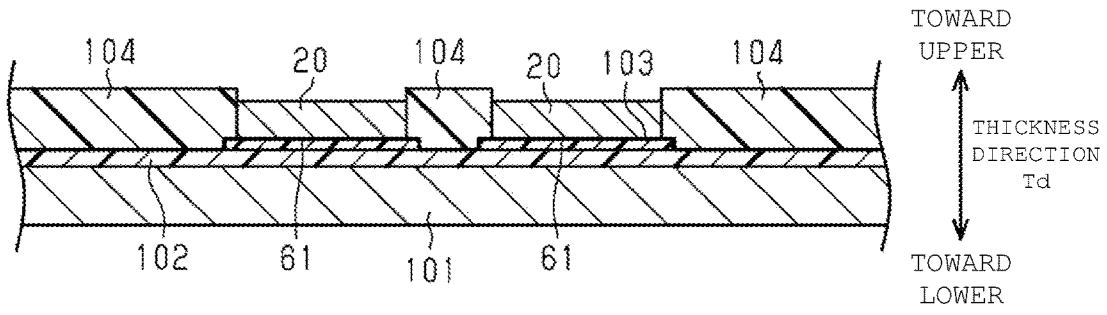
FIG. 10 is an explanatory diagram of the method of manufacturing the inductor component according to the first embodiment.

Next, as illustrated in FIG. 10, a wiring processing step of forming the inductor wire 20, the first support wire 41, and the second support wire 42 by electrolytic plating in a portion, of the upper face of the insulation resin 61, that is not coated with the first coating portion 104. Specifically, electrolytic copper plating is performed to grow copper from a portion from which the seed layer 103 is exposed on the upper face of the insulation resin 61. As a result, the inductor wire 20, the first support wire 41, and the second support wire 42 are formed. Therefore, in the embodiment, the step of forming the plurality of inductor wires 20 and the step of forming the plurality of first support wires 41 and the plurality of second support wires 42 that connects pads of different inductor wires 20 are the same step. The inductor wire 20, the first support wire 41, and the second support wire 42 are formed on the same plane. In FIG. 10, the inductor wire 20 is illustrated, and each support wire is not illustrated.

Figure 11:
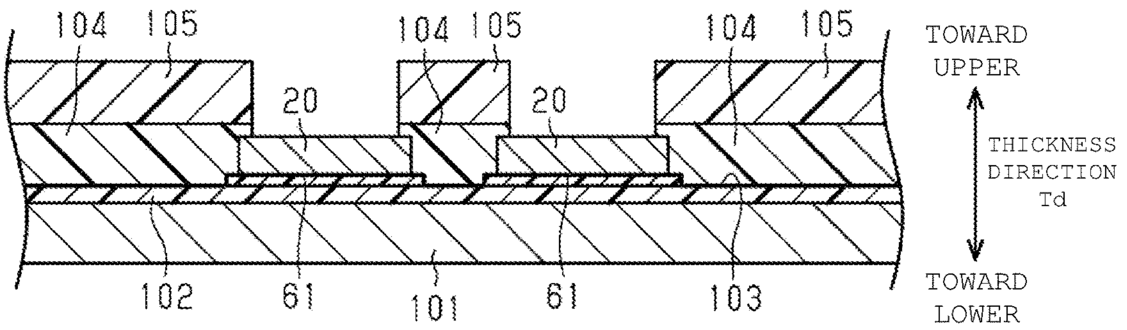
FIG. 11 is an explanatory diagram of the method of manufacturing the inductor component according to the first embodiment.

Next, as illustrated in FIG. 11, a second coating step of forming a second coating portion 105 is performed. The range in which the second coating portion 105 is formed is a range, of the whole upper face of the first coating portion 104, the whole upper face of each support wire, and the upper face of the inductor wire 20, in which the first vertical wire 71 and the second vertical wire 72 are not formed. The second coating portion 105 is formed in this range by the same photolithography as the method of forming the first coating portion 104. The dimension of the second coating portion 105 in the thickness direction Td is the same as that of the first coating portion 104.

Next, a vertical wiring processing step of forming each vertical wire is performed. Specifically, the first vertical wire 71 and the second vertical wire 72 are formed by electrolytic copper plating on a portion, of the inductor wire 20, that is not coated with the second coating portion 105. As a result, the first vertical wire 71 and the second vertical wire 72 are formed in the thickness direction Td perpendicular to the plane where the plurality of inductor wires 20 and the first support wire 41 and the second support wire 42 are formed. In the vertical wiring processing step, the upper end of the growing copper is set to be slightly lower than the upper face of the second coating portion 105. Specifically, the dimension of each vertical wire in the thickness direction Td before cutting described later is set to be the same as the dimension of each inductor wire in the thickness direction Td.

Figure 12:
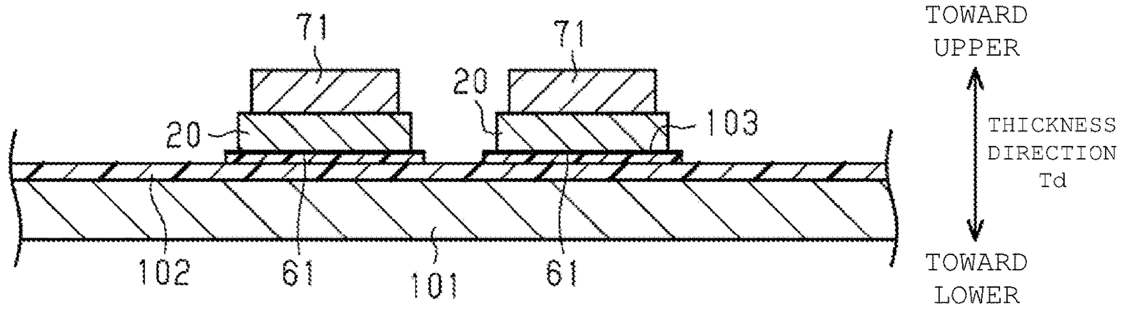
FIG. 12 is an explanatory diagram of the method of manufacturing the inductor component according to the first embodiment.

Next, as illustrated in FIG. 12, a coating portion removing step of removing the first coating portion 104 and the second coating portion 105 is performed. Specifically, the first coating portion 104 and the second coating portion 105 are removed by wet etching the first coating portion 104 and the second coating portion 105 with a chemical. In FIG. 12, the first vertical wire 71 is illustrated, and the second vertical wire 72 is not illustrated.

Next, a seed layer etching step of etching the seed layer 103 is performed. The exposed seed layer 103 is removed by etching the seed layer 103. As described above, each inductor wire and each support wire are formed by a semi additive process (SAP).

Figure 13:
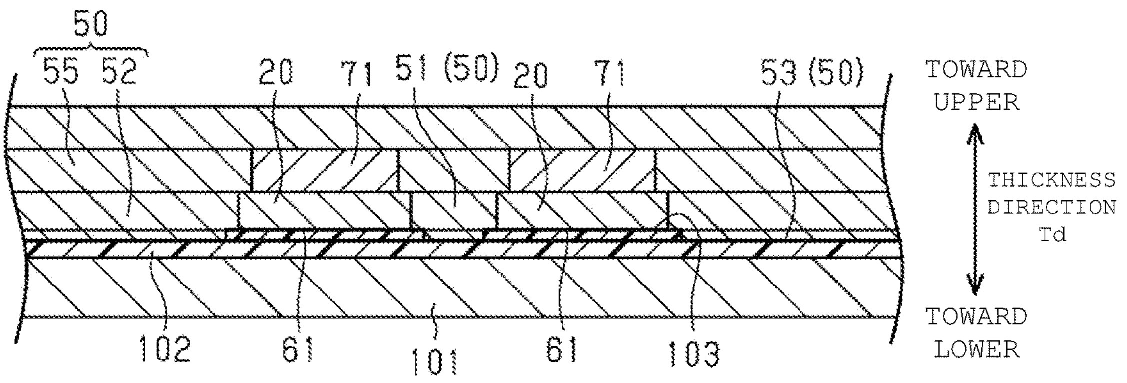
FIG. 13 is an explanatory diagram of the method of manufacturing the inductor component according to the first embodiment.

Next, as illustrated in FIG. 13, a second magnetic layer processing step of laminating the inner magnetic path portion 51, the outer magnetic path portion 52, the insulation resin magnetic layer 53, and the second magnetic layer 55 is performed. Specifically, first, a resin containing the magnetic powder, which is the material of the magnetic layer 50, is applied to the upper face of the base member 101. At this time, the resin containing the magnetic powder is applied so as to cover the upper faces of the respective vertical wires. Next, the resin containing the magnetic powder is hardened by press working to form the inner magnetic path portion 51, the outer magnetic path portion 52, the insulation resin magnetic layer 53, and the second magnetic layer 55 on the upper face of the base member 101.

Figure 14:
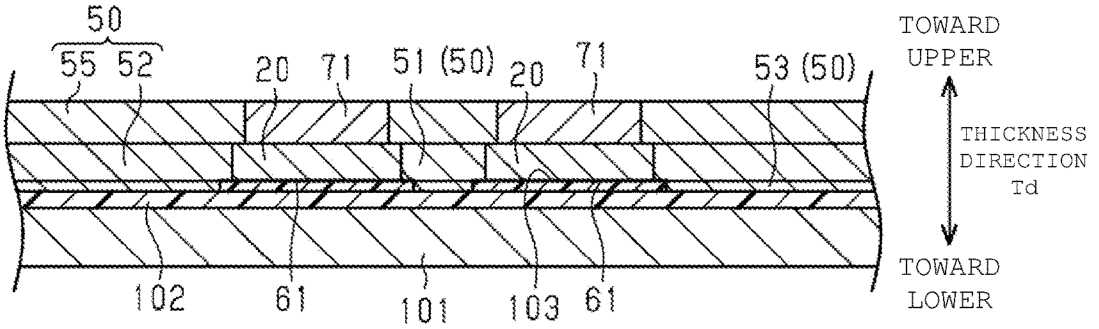
FIG. 14 is an explanatory diagram of the method of manufacturing the inductor component according to the first embodiment.

Next, as illustrated in FIG. 14, the upper portion of the second magnetic layer 55 is scraped until the upper face of each vertical wire is exposed. The inner magnetic path portion 51, the outer magnetic path portion 52, the insulation resin magnetic layer 53, and the second magnetic layer 55 are integrally formed, but in the drawing, the inner magnetic path portion 51, the outer magnetic path portion 52, the insulation resin magnetic layer 53, and the second magnetic layer 55 are illustrated separately.

Figure 15:
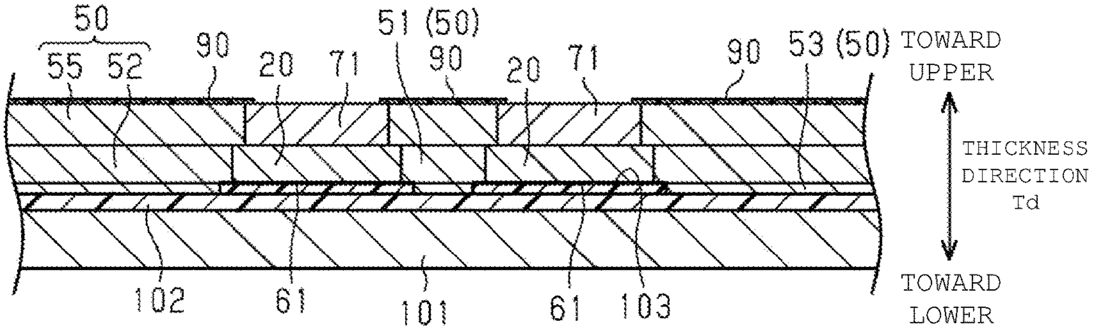
FIG. 15 is an explanatory diagram of the method of manufacturing the inductor component according to the first embodiment.

Next, as illustrated in FIG. 15, an insulation layer processing step is performed. Specifically, a solder resist functioning as the insulation layer 90 is patterned by photolithography on a portion, of the upper face of the second magnetic layer 55 and the upper face of each vertical wire, where each external terminal is not formed. In the present embodiment, the direction orthogonal to the upper face of the insulation layer 90, that is, the main face MF of the element body BD, is the thickness direction Td.

Figure 16:
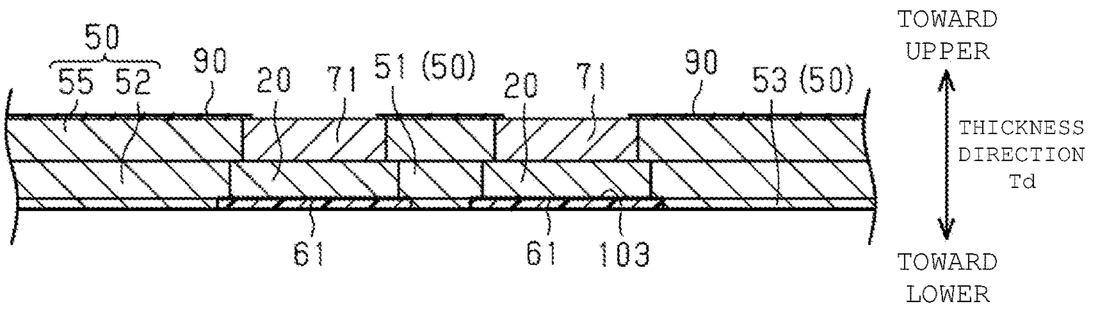
FIG. 16 is an explanatory diagram of the method of manufacturing the inductor component according to the first embodiment.

Next, as illustrated in FIG. 16, a base member cutting step is performed. Specifically, the base member 101 and the dummy insulation layer 102 are all removed by cutting. As a result of cutting the whole dummy insulation layer 102, part of the lower portion of each insulation resin is removed by cutting, but each inductor wire is not removed.

Figure 17:
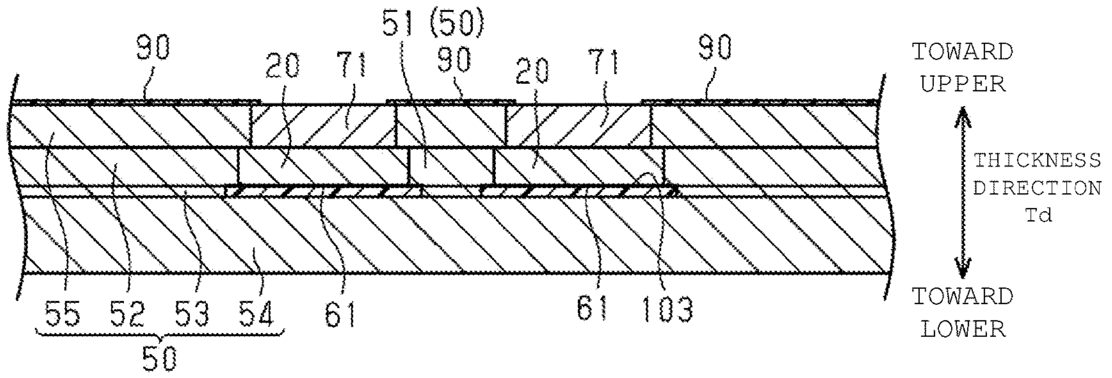
FIG. 17 is an explanatory diagram of the method of manufacturing the inductor component according to the first embodiment.

Next, as illustrated in FIG. 17, a first magnetic layer processing step of laminating the first magnetic layer 54 is performed. Specifically, first, a resin containing the magnetic powder, which is the material of the first magnetic layer 54, is applied to the lower face of the base member 101. Next, the resin containing the magnetic powder is hardened by press working to form the first magnetic layer 54 on the lower face of the base member 101.

Next, the lower end of the first magnetic layer 54 is scraped. For example, the lower end of the first magnetic layer 54 is scraped so that the dimension from the upper face of each external terminal to the lower face of the first magnetic layer 54 is a desired value.

Figure 18:
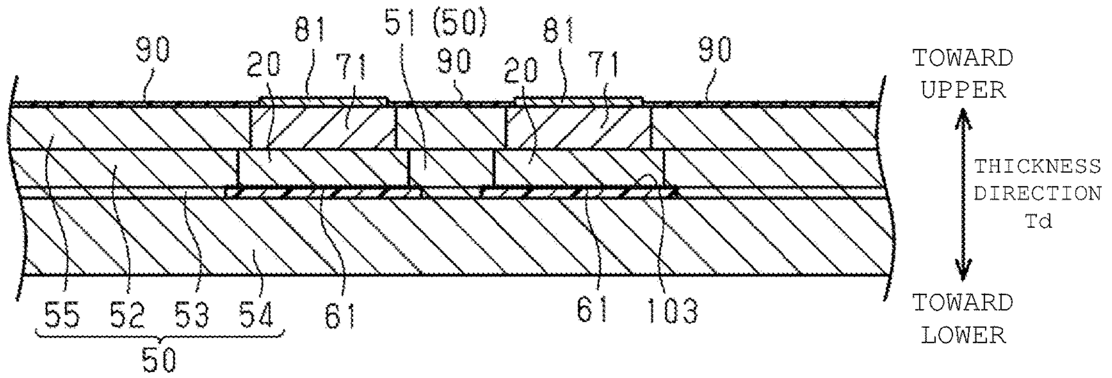
FIG. 18 is an explanatory diagram of the method of manufacturing the inductor component according to the first embodiment.

Next, as illustrated in FIG. 18, a terminal portion processing step is performed. Specifically, the first external terminal 81 and the second external terminal 82 are formed on a portion, of the upper face of the second magnetic layer 55 and the upper face of each vertical wire, which is not covered with the insulation layer 90. These metal layers are formed by electroless plating for each of copper, nickel, and gold. In addition, there may be a catalyst layer such as palladium between copper and nickel. As a result, the first external terminal 81 and the second external terminal 82 having a three-layer structure are formed. In FIG. 18, the first external terminal 81 is illustrated, and the second external terminal 82 is not illustrated.

Figure 19:
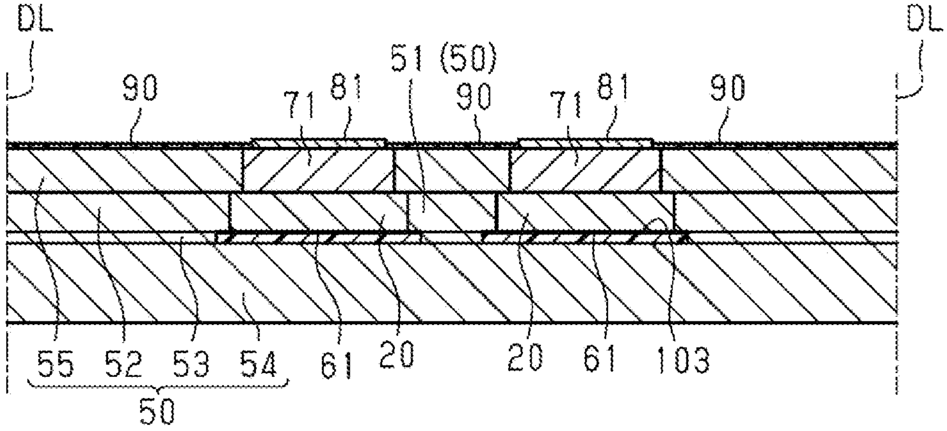
FIG. 19 is an explanatory diagram of the method of manufacturing the inductor component according to the first embodiment.

Next, as illustrated in FIG. 19, a segmenting step is performed. Specifically, segmentation is performed by cutting with a dicing machine at the break line DL. As a result, the inductor component 10 can be obtained.

Figure 20:
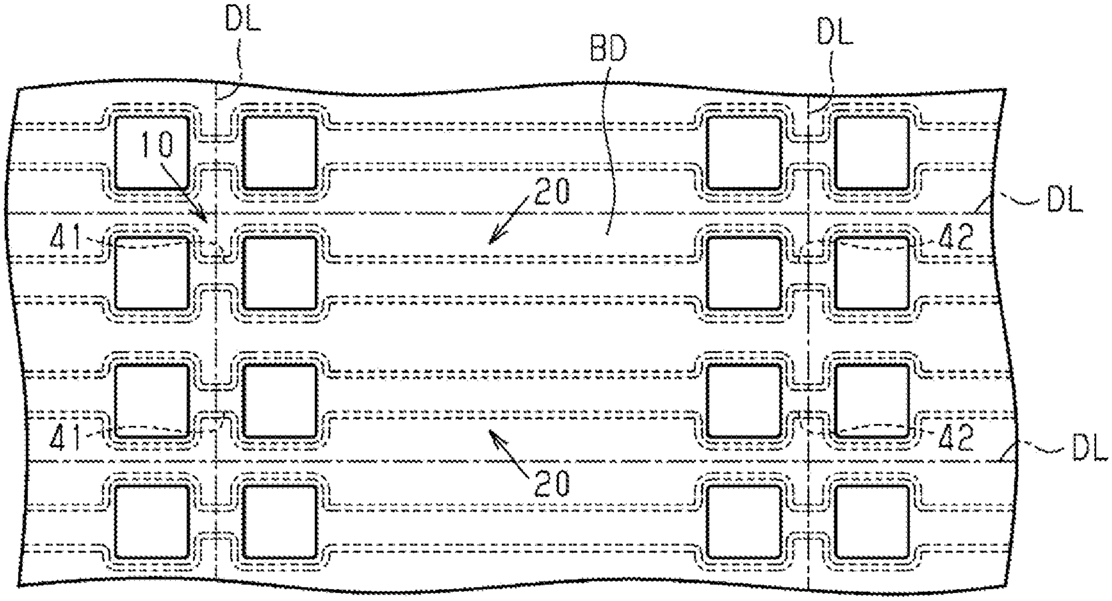
FIG. 20 is an explanatory diagram of the method of manufacturing the inductor component according to the first embodiment.

In a state before cutting with a dicing machine, for example, as illustrated in FIG. 20, a plurality of inductor components is disposed side by side in the longitudinal direction Ld and the short direction Wd, and the individual inductor components are connected by the element body BD, the first support wire 41, and the second support wire 42. By cutting the first support wire 41 and the second support wire 42 including the break line DL in the thickness direction Td, the cut face of the first support wire 41 is exposed from the first side face 93 as the exposed face 41A. Further, the cut face of the second support wire 42 is exposed from the second side face 94 as the exposed face 42A. In FIG. 20, the fifth layer L5 is not illustrated.

After the segmenting step, each inductor component 10 is allowed to stand for a certain period in the presence of oxygen. As a result, a portion including the exposed face 41A of the first support wire 41 and a portion including the exposed face 42A of the second support wire 42 are oxidized to form a Cu oxide.

As described above, in the segmenting step, the first support wire 41 and the second support wire 42 including the break line DL are cut. When the first support wire 41 and the second support wire 42 are cut, a shearing stress is applied to the first support wire 41 and the second support wire 42. Each support wire is deformed by the stress. Therefore, as illustrated in FIG. 5, the cross section of the first support wire 41 at the first side face 93, that is, the exposed face 41A, has a distorted shape. Similarly, the cross section of the second support wire 42 at the second side face 94, that is, the exposed face 42A, has a distorted shape.

Next, the operation of the first embodiment will be described.

In the first embodiment, when the element body BD having a rectangular parallelepiped shape is viewed from the thickness direction Td, the main face MF has a rectangular shape elongated in the longitudinal direction Ld. The wiring body 21 of the inductor wire 20 extends linearly in the longitudinal direction Ld, that is, in the long side direction of the main face MF.

Next, effects of the first embodiment will be described.

(1-1) According to the first embodiment, the inductor wire 20 includes the elongated linear wiring body 21. The dimension of the main face MF in the longitudinal direction Ld is 2.5 times the dimension of the main face MF in the short direction Wd. The dimension of the first side LS of the inductor region IA is about nine times the dimension of the second side SS of the inductor region IA. Therefore, since the wiring body 21 of the inductor wire 20 of the first embodiment is linear, for example, it can reduce the DC electric resistance as compared with a spiral inductor wire having the same wiring length. In addition, the wiring length of the wiring body 21 can be secured by securing the inductor region IA long in the longitudinal direction Ld of the element body BD.

(1-2) According to the first embodiment, the dimension of the element body BD in the thickness direction Td is smaller than the dimension of the element body BD in the short direction Wd. Therefore, the whole inductor component 10 can be thinned.

(1-3) In the first embodiment, two inductor wires 20 are disposed side by side in the short direction Wd on the same plane. Therefore, the maximum range, of the element body BD in the short direction Wd, in which the inductor wire 20 per one can be disposed is a range of a value obtained by dividing the dimension of the element body BD in the short direction Wd by “2”, which is the number of the inductor wires 20 disposed side by side in the short direction Wd. According to the first embodiment, the dimension of the main face MF in the longitudinal direction Ld is 5 times a value obtained by dividing the dimension of the main face MF in the short direction Wd by the number of the inductor wires 20 disposed side by side in the short direction Wd. Therefore, when two inductor wires 20 are provided on the same plane, the dimension of each inductor wire 20 in the longitudinal direction Ld can be secured.

(1-4) According to the first embodiment, in the inductor component 10, the two inductor wires 20 are equally disposed in the short direction Wd. Therefore, it is possible to suppress the occurrence of deviation in the short direction Wd with respect to any of the strength, weight, and the like of the inductor component 10. In addition, it is possible to suppress a difference in electrical characteristics between the two inductor wires 20 due to the two inductor wires 20 being unevenly disposed.

(1-5) According to the first embodiment, the dimension of the element body BD in the thickness direction Td is smaller than a value obtained by dividing the dimension of the main face MF in the short direction Wd by “2”, which is the number of the inductor wires 20 disposed side by side in the short direction Wd. In other words, the plurality of inductor wires 20 is not laminated in the thickness direction Td, but exists on the same plane. Therefore, when there is a plurality of inductor wires 20, the inductor component 10 can be thinned.

(1-6) In the first embodiment, when viewed from the thickness direction Td, the distance in the short direction Wd between the geometric center of the first pad 22 of the first inductor wire 20R and the geometric center of the first pad 22 of the second inductor wire 20L is one-third of the dimension of the first side LS of the inductor region IA. That is, the first inductor wire 20R and the second inductor wire 20L are disposed at a correspondingly close distance. Therefore, it is possible to suppress the excessively large dimension of the element body BD in the short direction Wd.

(1-7) In the first embodiment, the wiring body 21 of the inductor wire 20 is linear. When the wiring body 21 is linear, the wiring body 21 has a shorter wiring length than the wiring body which is curved. Since the wiring length is short, it is easy to secure the volumes of the inner magnetic path portion 51 and the outer magnetic path portion 52 disposed in the first layer L1. In addition, since the wiring body 21 is linear, the direct current resistance of the wiring body 21 is small. From the above, the acquisition rate of the inductance value of the inductor component 10 is less likely to decrease. In addition, when the wiring body 21 is linear, when the wiring bodies 21 are disposed in parallel on the same plane as in the present embodiment, the dimension of the inductor component 10 is less likely to increase, and it is easy to form a small inductor component.

(1-8) In the first embodiment, the extension direction of the wiring body 21 of the inductor wire 20 coincides with the longitudinal direction Ld of the element body BD. Therefore, the dimension in the longitudinal direction Ld of the element body BD is suitable for securing the wiring length of the wiring body 21.

(1-9) In the first embodiment, the dimension of the element body BD in the thickness direction Td is about 0.2 mm. The smaller the dimension of the element body BD in the thickness direction Td, the smaller the dimension protruding from the substrate when the inductor component 10 is mounted on the substrate. Therefore, the inductor component 10 according to the first embodiment can also be mounted on a portion where it cannot be mounted when the dimension in the thickness direction Td is large.

(1-10) In the first embodiment, the inductor wire 20, the first support wire 41, and the second support wire 42 are present in the first layer L1. In a state in which the plurality of inductor components 10 is disposed in parallel, that is, in a state before cutting with a dicing machine, a configuration in which the plurality of inductor wires is connected by the first support wire 41 and the second support wire 42 can be employed. When the plurality of inductor wires 20 is connected by the first support wire 41 and the second support wire 42, these inductor wires 20 can be supported and positioned without requiring a substrate or the like for supporting the inductor wire 20. Therefore, it is possible to contribute to thinning of the inductor component 10 in that a substrate or the like for supporting the inductor wire 20 is unnecessary.

(1-11) It is assumed that the central axis line A1 of the first support wire 41 coincides with the central axis line C1 of the wiring body 21, and the central axis line A2 of the second support wire 42 coincides with the central axis line C1 of the wiring body 21. In this state, when a torsion force is applied to the inductor component 10, the inductor wire 20, the first support wire 41, and the second support wire 42 can function as a central axis of torsion, and thus, it is difficult for the element body BD as a whole to resist the torsion force.

On the other hand, in the first embodiment, the central axis line A1 of the first support wire 41 does not coincide with the central axis line C1 of the wiring body 21, and the central axis line A2 of the second support wire 42 does not coincide with the central axis line C1 of the wiring body 21. Therefore, the inductor wire 20, the first support wire 41, and the second support wire 42 as a whole do not function as the central axis of torsion, and the strength against the torsion force can be improved.

(1-12) In the first embodiment, the whole inductor wire 20 is covered with the magnetic layer 50. The first magnetic layer 54 and the second magnetic layer 55 are made of organic resin a containing metal magnetic powder. The metal magnetic powder is an alloy containing iron, and the average grain diameter of the metal magnetic powder is about 5 micrometers. By using the magnetic powder having a small grain diameter of 10 micrometers or less in this manner, it is possible to reduce the iron loss while ensuring the relative permeability of the first magnetic layer 54 and the second magnetic layer 55.

(1-13) In the first embodiment, the pitch in the short direction Wd from the central axis line C1 of the wiring body 21 of the first inductor wire 20R to the central axis line C1 of the wiring body 21 of the second inductor wire 20L is about 250 micrometers. The value is twice or more the minimum distance among the distance from the first support wire 41 to the end of the first side face 91 in the short direction Wd and the distance from the second support wire 42 to the end of the second side face 92 in the short direction Wd. As a result, since the pitch can be made relatively large and the space between the wiring bodies 21 having a relatively high magnetic flux density can be made large, the acquisition efficiency of the inductance value can be improved.

In the first embodiment, the interval between the first pads 22 and the interval between the second pads 23, which are the minimum intervals between the adjacent inductor wires 20, are approximately 50 micrometers or more. This is suitable for ensuring insulation between the inductor wires 20. Furthermore, it is still preferable that the interval is about 100 micrometers or more.

Second Embodiment

Hereinafter, the second embodiment of the inductor component will be described. In the drawings, components may be illustrated in an enlarged manner for easy understanding. The dimension ratios of the components may be different from the actual ones or those in another figure. In addition, the description of the same configuration as that of the first embodiment may be simplified or omitted.

Figure 21:
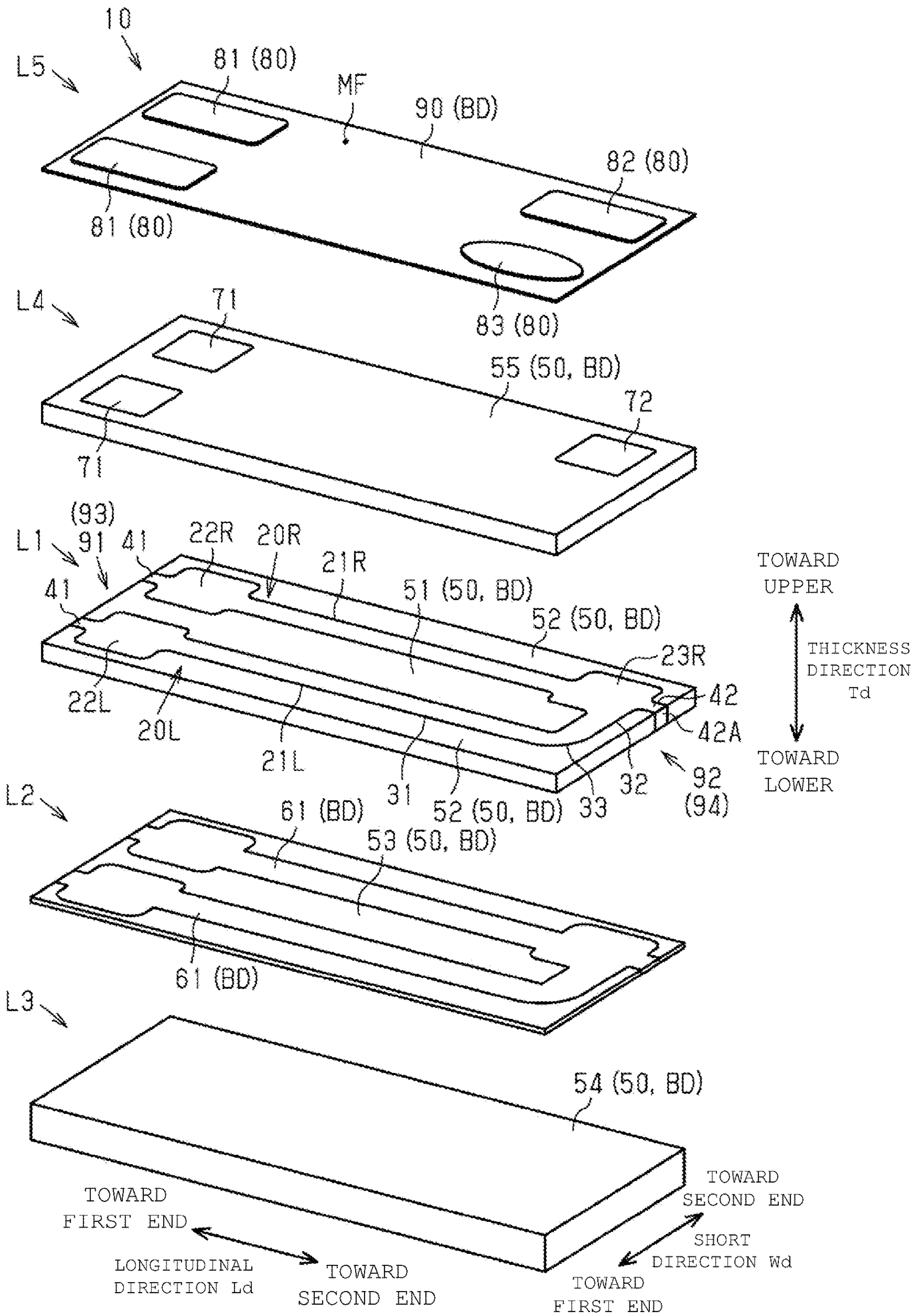
FIG. 21 is an exploded perspective view of an inductor component according to the second embodiment.

As illustrated in FIG. 21, the inductor component 10 as a whole has a structure in which five layers are laminated in the thickness direction Td. In the following description, one side in the thickness direction Td is an upper side, and the opposite side is a lower side.

The first layer L1 includes the first inductor wire 20R, the second inductor wire 20L, the first support wire 41, the second support wire 42, the inner magnetic path portion 51, and the outer magnetic path portion 52.

The first layer L1 has a rectangular shape when viewed from the thickness direction Td. A direction parallel to the long side of the rectangular shape is defined as a longitudinal direction Ld, and a direction parallel to the short side is defined as a short direction Wd.

The first inductor wire 20R includes a first wiring body 21R, a first pad 22R provided at the first end of the first wiring body 21R, and a second pad 23R provided at the second end of the first wiring body 21R. The first wiring body 21R extends linearly in the longitudinal direction Ld of the first layer L1. Therefore, the first end of the first wiring body 21R is located closer to the first end in the longitudinal direction Ld than the second end of the first wiring body 21R. The first pad 22R is connected to the first end, of the first wiring body 21R, toward the first end in the longitudinal direction Ld. The first end, of the wiring body 21, toward the first end in the longitudinal direction Ld may be enlarged so as to be wider than the central portion of the wiring body 21 in the longitudinal direction Ld.

The dimension of the first pad 22R in the short direction Wd is larger than the dimension of the first wiring body 21R in the short direction Wd. The first pad 22R has a substantially square shape when viewed from the thickness direction Td.

In addition, the second pad 23R is connected to the second end, of the first wiring body 21R, toward the second end in the longitudinal direction Ld. The second end, of the wiring body 21, toward the second end in the longitudinal direction Ld may be enlarged so as to be wider than the central portion of the wiring body 21 in the longitudinal direction Ld.

The dimension of the second pad 23R in the short direction Wd is larger than the dimension of the first wiring body 21R in the short direction Wd. When viewed from the thickness direction Td, the second pad 23R has substantially the same square shape as the first pad 22R. The first inductor wire 20R is disposed close to the second end of the first layer L1 in the short direction Wd.

The second inductor wire 20L includes a second wiring body 21L, a first pad 22L provided at the first end of the second wiring body 21L, and the second pad 23R provided at the second end of the second wiring body 21L.

The second wiring body 21L has two straight portions and a portion connecting the two straight portions, and extends in an L shape as a whole. Therefore, the first end of the second wiring body 21L is located closer to the first end in the longitudinal direction Ld than the second end of the second wiring body 21L. Specifically, the second wiring body 21L includes a long straight portion 31 extending in the longitudinal direction Ld, a short straight portion 32 extending in the short direction Wd, and a connection portion 33 connecting these portions.

Figure 22:
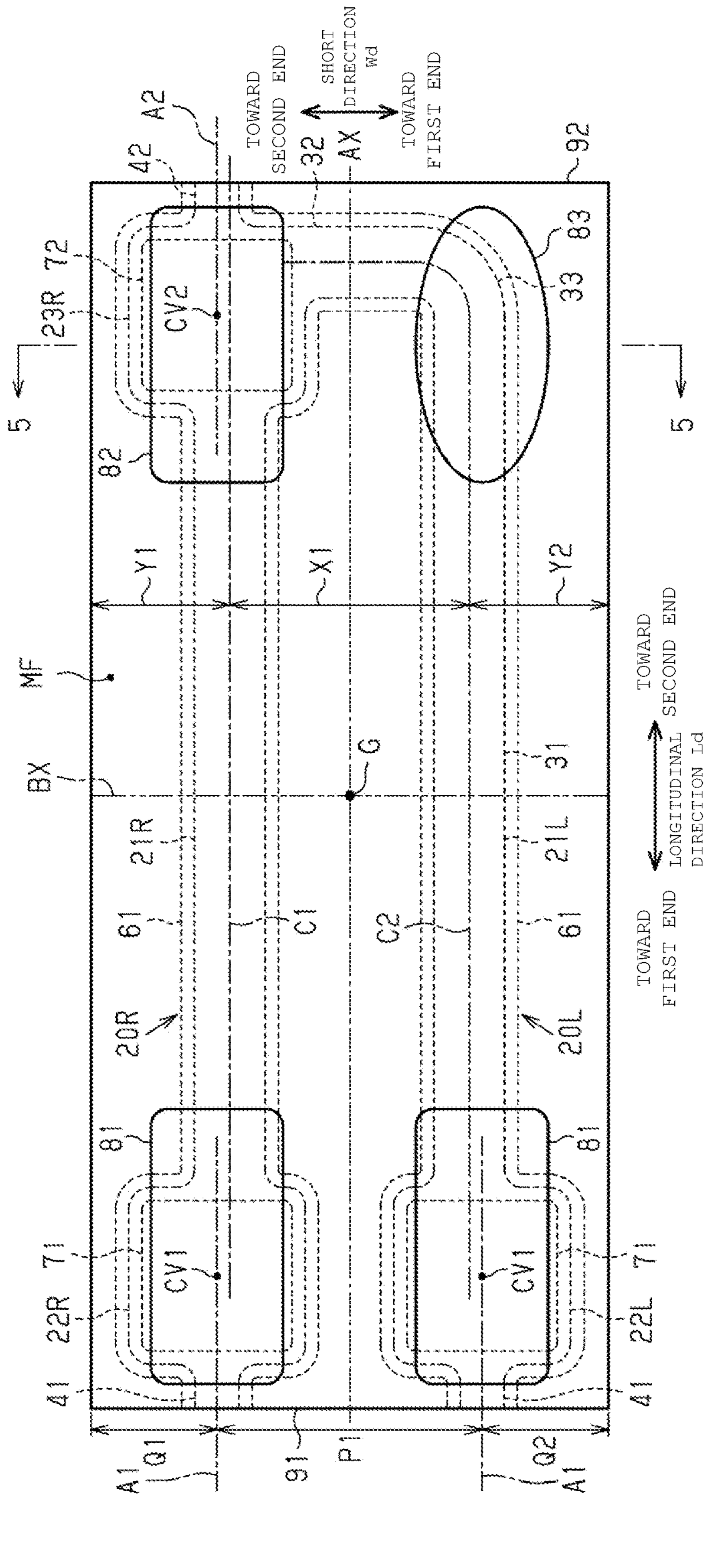
FIG. 22 is a transparent top view of the inductor component according to the second embodiment.

As illustrated in FIG. 22, when a straight line passing through the center of the first layer L1 in the short direction Wd and extending in the longitudinal direction Ld is defined as a symmetry axis AX, the long straight portion 31 is disposed at a position line-symmetric to that of the first wiring body 21R with respect to the symmetry axis AX. The length of the long straight portion 31 extending in the longitudinal direction Ld is slightly longer than the length of the first wiring body 21R extending in the longitudinal direction Ld. The dimension of the long straight portion 31 in the short direction Wd is equal to the dimension of the first wiring body 21R in the short direction Wd. The first end, of the long straight portion 31, toward the first end in the longitudinal direction Ld is connected to the first pad 22R. The end, of the long straight portion 31, toward the second end in the longitudinal direction Ld is connected to the first end of the connection portion 33.

The second end, of the connection portion 33, that is not connected to the long straight portion 31 faces the second end in the short direction Wd. That is, in the second wiring body 21L, the connection portion 33 is curved at 90 degrees from the first direction in the longitudinal direction Ld toward the second end in the short direction Wd.

The second end facing the second end of the connection portion 33 in the short direction Wd is connected to the first end of the short straight portion 32. The second end, of the short straight portion 32, toward the second end in the short direction Wd may be enlarged so as to be wider than the central portion of the short straight portion 32 in the short direction Wd.

The dimension of the short straight portion 32 in the longitudinal direction Ld is equal to the dimension of the long straight portion 31 in the short direction Wd. The second end, of the short straight portion 32, facing the second end in the short direction Wd is connected to the second pad 23R connected to the first wiring body 21R. That is, the second pad 23R in the first inductor wire 20R is identical to the second pad 23R in the second inductor wire 20L. In other words, the first inductor wire 20R and the second inductor wire 20L have the second pad 23R in common.

The number of turns of the second inductor wire 20L is determined based on the imaginary vector. The start point of the imaginary vector is disposed on the central axis line C2 extending in the extension direction of the second wiring body 21L through the center of the wiring width of the second wiring body 21L. Then, when viewed from the thickness direction Td, when the imaginary vector is moved from the state in which the start point of the second wiring body 21L is disposed at the first end to the second end of the central axis line C2, the number of turns is determined as 1.0 turn when the angle at which the direction of the imaginary vector is rotated is 360 degrees. However, in a case where the direction of the imaginary vector is wound a plurality of times, the number of turns is assumed to increase in a case where the imaginary vector is continuously wound in the same direction. When the imaginary vector is wound in a direction different from the direction of the previous winding, the number of turns is counted again from 0 turn. For example, when winding is performed 180 degrees clockwise and then winding is performed 180 degrees counterclockwise, 0.5 turns are obtained. Therefore, for example, when winding is performed 180 degrees, the number of turns is 0.5 turns. In the present embodiment, the direction of the imaginary vector imaginarily disposed on the second wiring body 21L is rotated by 90 degrees at the connection portion 33. Therefore, the number of turns when the second wiring body 21L is wound is 0.25 turns. The central axis line C2 of the second wiring body 21L is a line that traces a midpoint of the second wiring body 21L in a direction orthogonal to the direction in which the second wiring body 21L extends. That is, when viewed from the thickness direction Td, the central axis line C2 of the second wiring body 21L has a substantially L shape.

As illustrated in FIG. 22, the first pad 22L is connected to the end, of the long straight portion 31 of the second wiring body 21L, toward the first end in the longitudinal direction Ld. The first pad 22L has the same shape as the first pad 22R connected to the first wiring body 21R. That is, when viewed from the thickness direction Td, the first pad 22L has a substantially square shape. In addition, the first pad 22L is disposed line-symmetrically to the first pad 22R connected to the first wiring body 21R with respect to the symmetry axis AX.

In the first layer L1, the first support wire 41 extends from a portion, of the first pad 22R, away from the first wiring body 21R. That is, the first support wire 41 extends from the edge, of the first pad 22R, toward the first end in the longitudinal direction Ld. The first support wire 41 extends linearly in parallel with the longitudinal direction Ld. The first support wire 41 extends to a first side face 91, of the first layer L1, toward the first end in the longitudinal direction Ld and is exposed from the first side face 91. Similarly, in the first layer L1, the first support wire 41 extends from a portion, of the first pad 22L, away from the second wiring body 21L.

In the first layer L1, the second support wire 42 extends from a portion, of the second pad 23R, away from the first wiring body 21R. That is, the second support wire 42 extends from the edge, of the second pad 23R, toward the second end in the longitudinal direction Ld. The second support wire 42 extends linearly in parallel with the longitudinal direction Ld. The second support wire 42 extends to a second side face 92, of the first layer L1, toward the second end in the longitudinal direction Ld and is exposed from the second side face 92. In the present embodiment, no support wire is provided at a portion, of the second pad 23R, away from the short straight portion 32 of the second wiring body 21L.

The first inductor wire 20R and the second inductor wire 20L are made of a conductive material. In the present embodiment, the composition of the first inductor wire 20R and the second inductor wire 20L can be made of copper with a ratio of 99 wt % or more and sulfur with ratio of 0.1 wt % or more and 1.0 wt % or less (i.e., from 0.1 wt % to 1.0 wt %).

The first support wire 41 and the second support wire 42 are made of the same conductive material as the first inductor wire 20R and the second inductor wire 20L. However, part, of the first support wire 41, including an exposed face 41A exposed from the first side face 91 is made of a Cu oxide. Similarly, part, of the second support wire 42, including an exposed face 42A exposed from the second side face 92 is made of a Cu oxide.

As illustrated in FIG. 21, in the first layer L1, a region between the first inductor wire 20R and the second inductor wire 20L is the inner magnetic path portion 51. The inner magnetic path portion 51 is made of magnetic material. Specifically, the inner magnetic path portion 51 is made of organic resin containing the metal magnetic powder made of an iron-silica-based alloy or an amorphous alloy thereof. The metal magnetic powder is an alloy containing iron, and the average grain diameter of the metal magnetic powder can be about 5 micrometers. The handling of the average grain diameter is the same as in the first embodiment.

In the first layer L1, when viewed from the thickness direction Td, a region toward the second end in the short direction Wd relative to the first inductor wire 20R and a region toward the first end in the short direction Wd relative to the second inductor wire 20L are the outer magnetic path portion 52. The outer magnetic path portion 52 is made of the same magnetic material as the inner magnetic path portion 51.

In the present embodiment, the dimension of the first layer L1 in the thickness direction Td, that is, the dimension of each of the inductor wire 20, the first support wire 41, and the second support wire 42 in the thickness direction Td can be approximately 40 micrometers.

When viewed from the thickness direction Td, a second layer L2 having the same rectangular shape as the first layer L1 is laminated on a lower face which is a lower face of the first layer L1 in the thickness direction Td. The second layer L2 includes two insulation resins 61 and an insulation resin magnetic layer 53.

The insulation resins 61 cover the lower faces of the first inductor wire 20R, the second inductor wire 20L, the first support wire 41, and the second support wire 42 in the thickness direction Td. When viewed from the thickness direction Td, the insulation resin 61 has a shape that covers a range slightly wider than the outer edges of the first inductor wire 20R, the second inductor wire 20L, the first support wire 41, and the second support wire 42. As a result, the one insulation resin 61 has a straight band shape. The other insulation resin 61 has a band shape extending in a substantially L shape. The material of the insulation resin 61 is an insulation resin, and in the embodiment, for example, can be a polyimide-based resin. The insulation resin 61 has higher insulating properties than the inductor wire 20. The two insulation resins 61 are provided side by side in the short direction Wd corresponding to the number and arrangement of the inductor wires 20, and are connected to each other at the ends.

In the second layer L2, a portion excluding the two insulation resins 61 is the insulation resin magnetic layer 53. The insulation resin magnetic layer 53 is made of the same magnetic material as the inner magnetic path portion 51 and the outer magnetic path portion 52 described above.

When viewed from the thickness direction Td, a third layer L3 having the same rectangular shape as the second layer L2 is laminated on a lower face which is a lower face of the second layer L2 in the thickness direction Td. The third layer L3 is a first magnetic layer 54. Therefore, the first magnetic layer 54 is disposed below the inductor wire 20. The first magnetic layer 54 is made of an organic resin containing the metal magnetic powder same as that of the inner magnetic path portion 51, the outer magnetic path portion 52, and the insulation resin magnetic layer 53 described above.

On the other hand, when viewed from the thickness direction Td, a fourth layer L4 having the same rectangular shape as the first layer L1 is laminated on an upper face which is an upper face of the first layer L1 in the thickness direction Td. The fourth layer L4 includes two first vertical wires 71, one second vertical wire 72, and a second magnetic layer 55.

The first vertical wire 71 is directly connected to the upper face of the first pad 22R in the first inductor wire 20R without another layer interposed therebetween. That is, the first vertical wire 71, the first end of the first wiring body 21R, and the first support wire 41 are connected to the first pad 22R. Similarly, another first vertical wire 71 is directly connected to the upper face of the first pad 22L in the second inductor wire 20L without another layer interposed therebetween. The first vertical wire 71, the first end of the second wiring body 21L, and the first support wire 41 are connected to the first pad 22L. The two first vertical wires 71 are disposed in line symmetry with respect to the symmetry axis AX. The first vertical wire 71 is made of the same material as the first inductor wire 20R and the second inductor wire 20L. The first vertical wire 71 has a regular square pole shape, and the axial direction of the regular square pole coincides with the thickness direction Td.

As illustrated in FIG. 22, when viewed from the thickness direction Td, the dimension of each side of the square-shaped first vertical wires 71 is slightly smaller than the dimension of each side of the square-shaped first pad 22R. Therefore, the area of the first pad 22R is larger than the area of the first vertical wire 71 at the connection point with the first pad 22R. When viewed from above in the thickness direction Td, the central axis line CV1 of the first vertical wire 71 coincides with the geometric center of the substantially square first pad 22R. The two first vertical wires 71 are provided corresponding to the number of the first pads 22R.

As illustrated in FIG. 21, the second vertical wire 72 is directly connected to the upper face of the second pad 23R in the first inductor wire 20R without another layer interposed therebetween. That is, the second vertical wire 72, the second end of the first wiring body 21R, the second end of the second wiring body 21L, and the second support wire 42 are connected to the second pad 23R. The second vertical wire 72 is made of the same material as the first inductor wire 20R. The second vertical wire 72 has a regular square pole shape, and the axial direction of the regular square pole coincides with the thickness direction Td.

As illustrated in FIG. 22, when viewed from the thickness direction Td, the dimension of each side of the square second vertical wire 72 is slightly smaller than the dimension of each side of the square second pad 23R. Therefore, the area of the second pad 23R is larger than the area of the second vertical wire 72 at the connection point with the second pad 23R. When viewed from above in the thickness direction Td, the central axis line CV2 of the second vertical wire 72 coincides with the geometric center of the substantially square second pad 23R. The one second vertical wire 72 is provided corresponding to the number of the second pads 23R.

As illustrated in FIG. 21, a portion, of the fourth layer L4, excluding the two first vertical wires 71 and the two second vertical wires 72 is the second magnetic layer 55. Therefore, the second magnetic layer 55 is laminated on the upper faces of the inductor wires 20 and the support wires 41 and 42. That is, the support wires 41 and 42 are in direct contact with the second magnetic layer 55. The second magnetic layer 55 is made of the same magnetic material as the first magnetic layer 54 described above.

In the inductor component 10, the inner magnetic path portion 51, the outer magnetic path portion 52, the insulation resin magnetic layer 53, the first magnetic layer 54, and the second magnetic layer 55 constitute a magnetic layer 50. The inner magnetic path portion 51, the outer magnetic path portion 52, the insulation resin magnetic layer 53, the first magnetic layer 54, and the second magnetic layer 55 are connected, and surround the first inductor wire 20R and the second inductor wire 20L. As described above, the magnetic layer 50 has a closed magnetic circuit for the first inductor wire 20R and the second inductor wire 20L. Therefore, the first inductor wire 20R and the second inductor wire 20L extend inside the magnetic layer 50. Although the inner magnetic path portion 51, the outer magnetic path portion 52, the insulation resin magnetic layer 53, the first magnetic layer 54, and the second magnetic layer 55 are illustrated separately, they are integrated as the magnetic layer 50, and the boundary thereof may not be confirmed.

When viewed from the thickness direction Td, a fifth layer L5 having the same rectangular shape as the fourth layer L4 is laminated on an upper face which is an upper face of the fourth layer L4 in the thickness direction Td. The fifth layer L5 includes four terminal portions 80 and an insulation layer 90. Two of the four terminal portions 80 are first external terminals 81 electrically connected to the respective first vertical wires 71. One of the four terminal portions 80 is a second external terminal 82 electrically connected to the second vertical wire 72. The remaining one, of the four terminal portions 80, other than the first external terminals 81 and the second external terminal 82 is a dummy portion 83 that is not electrically connected to any of the first inductor wire 20R and the second inductor wire 20L.

As illustrated in FIG. 22, when an imaginary straight line BX passing through the center of the fifth layer L5 in the longitudinal direction Ld and parallel to the short direction Wd is drawn, a point, on the upper face of the fifth layer L5, where the symmetry axis AX and the imaginary straight line BX described above intersect is a geometric center G of the fifth layer L5. The four terminal portions 80 are disposed at the two-fold symmetrical positions with respect to the geometric center G of the fifth layer L5 when viewed from the thickness direction Td.

The first external terminal 81 is directly connected to the upper face of the first vertical wire 71 without another layer interposed therebetween. When viewed from the thickness direction Td, the first external terminal 81 has a rectangular shape and is located on the second magnetic layer 55. The area in which the first external terminal 81 is in contact with the first vertical wire 71 is less than or equal to half the whole area of the first external terminal 81. The rectangular long side of the first external terminal 81 extends in parallel with the longitudinal direction Ld of the fifth layer L5, and the short side extends in parallel with the short direction Wd of the fifth layer L5. The two first external terminals 81 are provided corresponding to the number of the first vertical wires 71.

The second external terminal 82 is directly connected to the upper face of the second vertical wire 72 without another layer interposed therebetween. The area in which the second external terminal 82 is in contact with the second vertical wire 72 is less than or equal to half the whole area of the second external terminal 82. When viewed from the thickness direction Td, the second external terminal 82 has a rectangular shape and is located on the second magnetic layer 55. The rectangular long side of the second external terminal 82 extends in parallel with the longitudinal direction Ld of the fifth layer L5, and the short side extends in parallel with the short direction Wd of the fifth layer L5.

Figure 23:
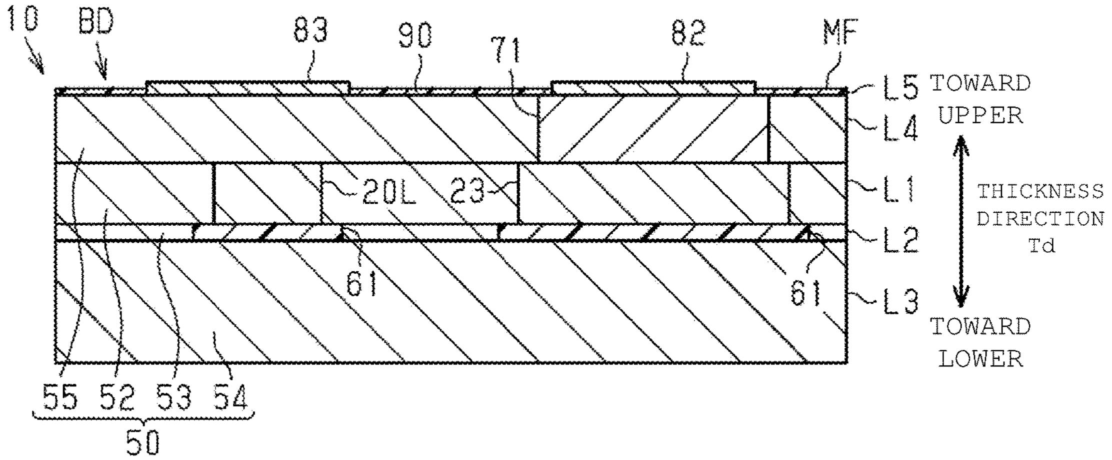
FIG. 23 is a sectional view of the inductor component taken along line 5-5 in FIG. 22.

As illustrated in FIG. 21, one of the four terminal portions 80 is the dummy portion 83. As illustrated in FIG. 23, the dummy portion 83 is directly connected to the upper face of the second magnetic layer 55 of the fourth layer L4 without another layer interposed therebetween. As illustrated in FIG. 22, when viewed from the thickness direction Td, the dummy portion 83 has a different shape from the first external terminal 81 and the second external terminal 82. In the present embodiment, the dummy portion 83 has an elliptical shape when viewed from the thickness direction Td. On the other hand, the shape of the dummy portion 83 is not limited to this, and may be, for example, a rectangular shape or a circular shape different from those of the first external terminal 81 and the second external terminal 82. The major axis of the ellipse of the dummy portion 83 extends in parallel with the longitudinal direction Ld of the fifth layer L5, and the minor axis extends parallel to the short direction Wd of the fifth layer L5.

When viewed from the thickness direction Td, most of the dummy portion 83 overlaps the second inductor wire 20L. More specifically, when viewed from the thickness direction Td, the dummy portion 83 is disposed at a position at which it overlaps the connection portion 33 in the second inductor wire 20L. When viewed from the thickness direction Td, the area of the dummy portion 83 is equal to the area of each of the first external terminal 81 and the second external terminal 82. In the present embodiment, "the same area" allows manufacturing errors. Therefore, when the difference in area between the dummy portion 83 and the first external terminal 81 and the second external terminal 82 is within ±10%, it can be considered that the areas are the same.

The four terminal portions 80 include a plurality of conductive layers. Specifically, it has a three-layer structure of copper, nickel, and gold. When viewed from the thickness direction Td, the second magnetic layer 55 and the first vertical wire 71 provided on the lower face of the first external terminal 81 in the thickness direction may be seen through. When viewed from the thickness direction Td, a region, of the first vertical wire 71, which can be seen through the first external terminal 81 is a region equal to or less than half the first external terminal 81.

Similarly, the second magnetic layer 55 and the second vertical wire 72 provided on the lower face of the second external terminal 82 in the thickness direction may be seen through. When viewed from the thickness direction Td, a region, of the second vertical wire 72, which can be seen through the second external terminal 82 is a region equal to or less than half the second external terminal 82.

The second magnetic layer 55 provided on the lower face of the dummy portion 83 in the thickness direction Td may be seen through. On the other hand, the region, of the second magnetic layer 55, which can be seen through the first external terminal 81 is a region equal to or more than half the first external terminal 81. The region, of the second magnetic layer 55, which can be seen through the second external terminal 82 is a region equal to or more than half the second external terminal 82. That is, when viewed from the thickness direction Td, the whole dummy portion 83 and half or more of the region of each of the first external terminal 81 and the second external terminal 82 have optically the same color. Here, the same color refers to a color when, for example, a difference between numerical values indicating RGB falls within a predetermined range when a color difference meter is used. The predetermined range is, for example, 10%.

A portion, of the fifth layer L5, excluding the terminal portion 80 is the insulation layer 90. In other words, a range of a portion, of the upper face of the fourth layer L4, that is not covered with the two first external terminals 81, the one second external terminal 82, and the one dummy portion 83 is covered with the insulation layer 90 of the fifth layer L5. The insulation layer 90 has higher insulating properties than the magnetic layer 50, and in the present embodiment, the insulation layer 90 is a solder resist. The dimension of the insulation layer 90 in the thickness direction Td is smaller than the dimension of the terminal portion 80 in the thickness direction Td.

In the present embodiment, the magnetic layer 50, the insulation resin 61, and the insulation layer 90 constitute an element body BD. That is, the element body BD has a rectangular shape when viewed from the thickness direction Td. In the present embodiment, the dimension of the element body BD in the thickness direction Td can be, for example, about 0.2 mm. The element body BD is a portion, of the inductor component 10, excluding conductive wires and terminals and is a portion having insulating properties. In addition, the element body BD has a rectangular parallelepiped shape, and does not include a protruding member in part. When the shape of the element body BD is a rectangular parallelepiped shape, the laminated portion is included in the element body BD.

Of the surface of the element body BD, an upper face of the insulation layer 90 in the thickness direction Td is the main face MF. Therefore, the inductor wire 20 extends in parallel with the main face MF of the element body BD. The first vertical wire 71 extends in the thickness direction Td from the first pad 22R of the inductor wire 20 toward the main face MF. Similarly, in another first vertical wire 71, the first vertical wire 71 extends in the thickness direction Td from the first pad 22L of the inductor wire 20 toward the main face MF. The first vertical wire 71 is exposed from the main face MF. A second vertical wire 72 extends in the thickness direction Td from the second pad 23R of the inductor wire 20 toward the main face MF. The second vertical wire 72 is exposed from the main face MF. The upper face of the terminal portion 80 is exposed from the main face MF and is located above the main face MF in the thickness direction Td. That is, the outer edge of each terminal portion 80 including the dummy portion 83 is in contact with the insulation layer 90. As in the present embodiment, at least part of the respective faces, of the first vertical wire 71 and the second vertical wire 72, exposed from the main face MF may be covered with the first external terminal 81 and the second external terminal 82, respectively.

The element body BD has a first side face 93 perpendicular to the main face MF. The first side face 91 of the first layer L1 is part of the first side face 93 of the element body BD. The element body BD has a second side face 94 which is a side face perpendicular to the main face MF and is parallel to the first side face 93. The second side face 92 of the first layer L1 is part of the second side face 94 of the element body BD. That is, the first support wire 41 extends from the first inductor wire 20R in parallel with the main face MF, and has an end exposed from the first side face 93 of the element body BD. Similarly, the second support wire 42 extends from the first inductor wire 20R in parallel with the main face MF, and has an end exposed from the second side face 94 of the element body BD.

When viewed from the thickness direction Td, the main face MF has a rectangular shape. When viewed from the thickness direction Td, a direction parallel to one side of the rectangular shape is defined as a first direction, and a direction parallel to the main face MF and orthogonal to the first direction is defined as a second direction. In the present embodiment, the first direction coincides with the longitudinal direction Ld, and the second direction coincides with the short direction Wd. Therefore, the dimension of the main face MF in the first direction is larger than the dimension of the main face MF in the second direction.

Specifically, the dimension of the main face MF in the longitudinal direction Ld is, for example, 1.5 mm. The dimension of the main face MF in the short direction Wd is, for example, 0.6 mm. Therefore, in the present embodiment, the dimension of the main face MF in the longitudinal direction Ld is 2.5 times the dimension of the main face MF in the short direction Wd.

In the present embodiment, the geometric center G of the fifth layer L5 coincides with the geometric center of the main face MF. When viewed from the thickness direction Td, the geometric center of the main face MF and the geometric center of the element body BD coincide with each other.

As illustrated in FIG. 22, it is assumed that the main face MF is imaginarily divided into a first region and a second region by the imaginary straight line BX that passes through the geometric center G of the main face MF and is parallel to one side of the main face MF in the short direction Wd. When a region toward the first end in the longitudinal direction Ld relative to the imaginary straight line BX is defined as a first region, the dummy portion 83 is not provided in the first region. When a region toward the second end in the longitudinal direction Ld relative to the imaginary straight line BX is defined as a second region, the dummy portions 83 whose number is the same as the number of the second external terminals 82 provided in the second region are provided in the second region.

Next, each wire will be described in detail.

As illustrated in FIG. 22, when viewed from the thickness direction Td, the central axis line C1 of the first wiring body 21R extends in the longitudinal direction Ld. The central axis line C1 of the first wiring body 21R is a line that traces a midpoint of the first wiring body 21R in a direction orthogonal to the direction in which the first wiring body 21R extends, that is, in the short direction Wd. In the present embodiment, the line width of each of the wiring bodies 21 is, for example, 50 micrometers.

As described above, the central axis line C2 of the second wiring body 21L of the second inductor wire 20L extends in a substantially L shape. Here, the wiring length of the long straight portion 31 of the second wiring body 21L is longer than the wiring length of the first wiring body 21R. In addition, the second wiring body 21L has a connection portion 33 and a short straight portion 32. Therefore, the wiring length of the second wiring body 21L is longer than the wiring length of the first wiring body 21R. Specifically, the wiring length of the second wiring body 21L is 1.2 times or more the wiring length of the first wiring body 21R.

The inductance value of the second inductor wire 20L is 1.1 times or more the inductance value of the first inductor wire 20R, reflecting the difference in the wiring length. In the present embodiment, the inductance value of the first inductor wire 20R is, for example, approximately 2.5 nH.

The first wiring body 21R of the first inductor wire 20R extends along one side of the outer edge of the element body BD in the longitudinal direction Ld. When viewed from the thickness direction Td, the first pad 22L and the second pad 23R of the second inductor wire 20L are disposed at symmetrical positions with respect to the geometric center G. In the present embodiment, the first pad 22L and the second pad 23R of the second inductor wire 20L are disposed at the two-fold symmetrical position with respect to the geometric center G.

The first inductor wire 20R has a parallel portion extending in parallel with the second inductor wire 20L. Specifically, the first wiring body 21R and the long straight portion 31 of the second wiring body 21L correspond to parallel portions. The first wiring body 21R and the long straight portion 31 are disposed side by side in the short direction Wd in the first layer L1. The parallel portions may be substantially parallel, and a manufacturing error is allowed.

In the following description, a distance between the central axis line C1 of the first wiring body 21R in the short direction Wd and the central axis line C2 of the long straight portion 31 of the second wiring body 21L is defined as a pitch X1 between the wiring bodies. The pitch between the wiring bodies is a pitch between adjacent parallel portions. In addition, the interval between the parallel portions of the adjacent inductor wires, that is, the distance between the end, of the first wiring body 21R, toward the first end in the short direction Wd and the end, of the long straight portion 31 of the second wiring body 21L, toward the second end in the short direction Wd in FIG. 22 is, for example, approximately 200 micrometers.

As illustrated in FIG. 22, the distance from the central axis line C1 of the first wiring body 21R to the end, of the element body, closest to the first wiring body 21R in the short direction Wd, that is, the end toward the second end, is defined as a first distance Y1. The distance from the central axis line C2 of the long straight portion 31, which is a parallel portion of the second inductor wire 20L, to the end, of the element body BD, closest to the long straight portion 31 in the short direction Wd, that is, the end toward the first end, is defined as a second distance Y2. In the present embodiment, the first distance Y1 has the same dimension as the second distance Y2.

In the short direction Wd, the pitch X1 between the wiring bodies is different in dimension from the first distance Y1 and the second distance Y2. Specifically, the pitch X1 between the wiring bodies can be approximately "250 micrometers". Each of the first distance Y1 and the second distance Y2 can be approximately "175 micrometers". As described above, each of the first distance Y1 and the second distance Y2 is preferably slightly larger than half the pitch X1.

When viewed from the thickness direction Td, the central axis line A1 of the first support wire 41 connected to the first pad 22R of the first inductor wire 20R extends in the longitudinal direction Ld. The central axis line A1 of the first support wire 41 is located outward in the short direction Wd relative to the central axis line C1 of the first wiring body 21R. That is, the extension line of the central axis line A1 of the first support wire 41 connected to the first inductor wire 20R does not coincide with the central axis line C1 of the first wiring body 21R. Therefore, the central axis line A1 of the first support wire 41 and the central axis line C1 of the first wiring body 21R are located on different straight lines. The extension line of the central axis line A1 of the first support wire 41 intersects with the central axis line CV1 of the first vertical wire 71.

The central axis line A1 of the first support wire 41 connected to the first pad 22L of the second inductor wire 20L extends in the longitudinal direction Ld. The central axis line A1 of the first support wire 41 is located outward in the short direction Wd relative to the central axis line C2 of the second wiring body 21L, more specifically, the central axis line C2 of the long straight portion 31. That is, the extension line of the central axis line A1 of the first support wire 41 connected to the second inductor wire 20L does not coincide with the central axis line C2 of the second wiring body 21L. Therefore, the central axis line A1 of the first support wire 41 and the central axis line C2 of the second wiring body 21L are located on different straight lines. The extension line of the central axis line A1 of the first support wire 41 intersects with the central axis line CV1 of the first vertical wire 71. The first support wire 41 connected to the first inductor wire 20R and the first support wire 41 connected to the second inductor wire 20L are disposed in line symmetry with respect to the symmetry axis AX.

When viewed from the thickness direction Td, the central axis line A2 of the second support wire 42 extends in the longitudinal direction Ld. The central axis line A2 of the second support wire 42 is located outward in the short direction Wd relative to the central axis line C1 of the first wiring body 21R. That is, the extension line of the central axis line A2 of the second support wire 42 does not coincide with the central axis line C1 of the first wiring body 21R. Therefore, the central axis line A2 of the second support wire 42 and the central axis line C1 of the first wiring body 21R are located on different straight lines. The second vertical wire 72 is disposed on the extension line of the central axis line A2 of the second support wire 42. The extension line of the central axis line A2 of the second support wire 42 intersects with the central axis line CV2 of the second vertical wire 72.

The first support wire 41 and the second support wire 42 extending from the first inductor wire 20R are disposed at the same position in the short direction Wd. That is, the central axis line A1 of the first support wire 41 and the central axis line A2 of the second support wire 42 are located on the same straight line. As in the first embodiment, when a deviation is within 10% based on the minimum line width of the first inductor wire 20R and the second inductor wire 20L, they are regarded as being on the same straight line. Specifically, the minimum line width of the inductor wire 20 in the present embodiment is 50 micrometers, which is the line width of each of the first wiring body 21R and the second wiring body 21L. Therefore, "on the same straight line" in the present embodiment is a case where the shortest distance between the two axis lines is within 5 micrometers, and "on different straight lines" is a case where the shortest distance between the two axis lines exceeds 5 micrometers.

As described above, in the first layer L1, the respective first support wires 41 are disposed in line symmetry with respect to the symmetry axis AX. Therefore, as illustrated in FIG. 22, a distance Q1 from the end of the element body BD toward the second end in the short direction Wd to the central axis line A1 of the first support wire 41 extending from the first inductor wire 20R is the same as a distance Q2 from the end of the element body BD toward the first end in the short direction Wd to the central axis line A1 of the first support wire 41 extending from the second inductor wire 20L.

On the other hand, in the short direction Wd, the pitch P1 from the central axis line A1 of the first support wire 41 extending from the first inductor wire 20R to the central axis line A1 of the first support wire 41 extending from the second inductor wire 20L is larger than each of the above-described distance Q1 and distance Q2. Specifically, the pitch P1 is about twice each of the distance Q1 and the distance Q2.

In the present embodiment, the sectional area of the first wiring body 21R in the cross section orthogonal to the central axis line C1 of the first wiring body 21R is equal to the sectional area of the second wiring body 21L. In the present application, when the deviation in the sectional area between the first wiring body 21R and the second wiring body 21L is within 10%, it is considered that they are equal.

The sectional area of the first support wire 41 in the cross section orthogonal to the central axis line A1 of the first support wire 41 is smaller than the sectional areas of the first wiring body 21R and the second wiring body 21L described above. The sectional area of the second support wire 42 in the cross section orthogonal to the central axis line A2 of the second support wire 42 is smaller than the sectional area of each of the first wiring body 21R and the second wiring body 21L described above.

Figure 24:
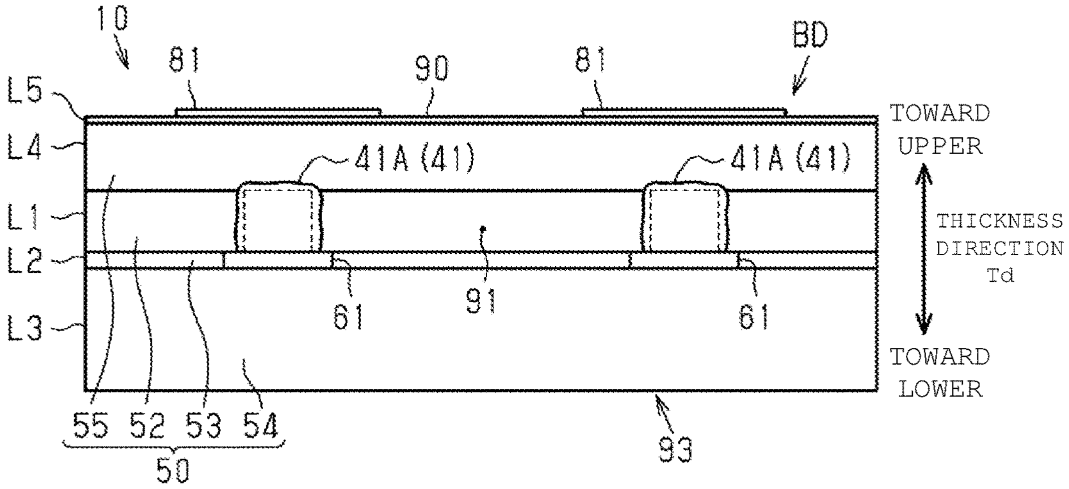
FIG. 24 is a side view illustrating a first side face of the inductor component according to the second embodiment.

As illustrated in FIG. 24, ends of the two first support wires 41 are exposed from the first side face 91, of the element body BD, toward the first end in the longitudinal direction Ld. The shape of the exposed face 41A, of each first support wire 41, exposed from the first side face 91 is a shape in which the sectional shape, of the first support wire 41, orthogonal to the central axis line A1 is slightly extended in the short direction Wd. As a result, the area of the exposed face 41A of the first support wire 41 is larger than the sectional area of the first support wire 41 inside the element body BD in the cross section orthogonal to the central axis line A1. Similarly, as illustrated in FIG. 21, the area of the exposed face 42A of the second support wire 42 exposed from the second side face 92 is larger than the sectional area of the second support wire 42 inside the element body BD in the cross section orthogonal to the central axis line A2. As a result, the contact areas of the first support wire 41 and the second support wire 42 with the first side face 93 and the second side face 94 of the element body BD are increased, and the adhesion therebetween is improved. The magnitude of the sectional area only is required to satisfy the above relationship, and for example, the exposed face 41A may have a shape in which one side is extended and the other side is covered with the extended portion of the element body BD.

The number of the first support wires 41 exposed from the first side face 93 is two, the number of the second support wires 42 exposed from the second side face 94 is one, and the number of the exposed support wires is different.

Figure 25:
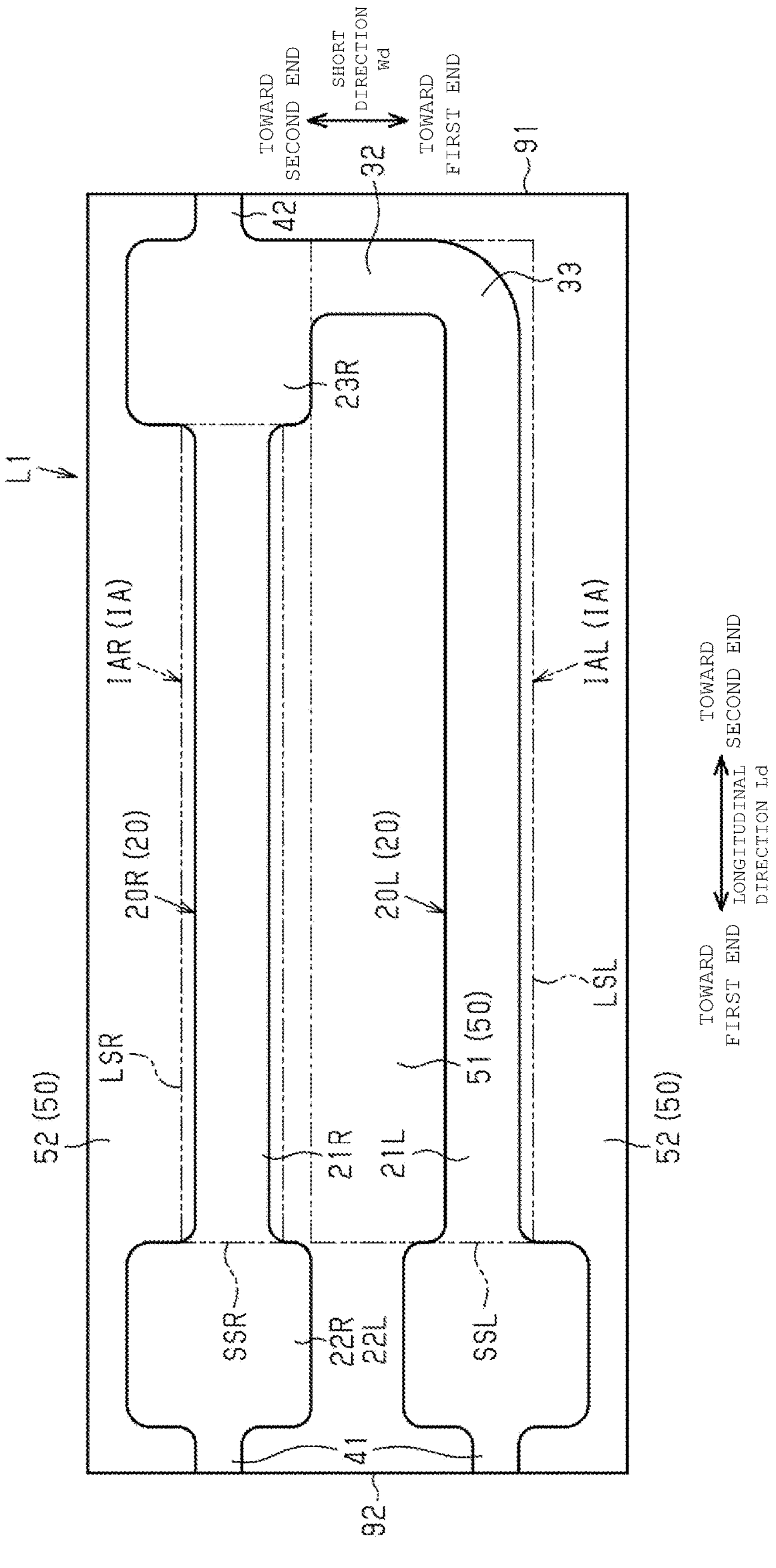
FIG. 25 is a top view of a first layer of the inductor component according to the second embodiment.

Here, when viewed from the thickness direction Td, an inductor region IA, which is the smallest region surrounding the whole wiring body 21 of the inductor wire 20, will be described in detail. As illustrated in FIG. 25, the inductor region IA is a rectangular region divided by the first side LS extending in the longitudinal direction Ld and the second side SS extending in the short direction Wd. In addition, the one inductor region IA is the smallest rectangular region surrounding the one whole wiring body 21. The dimension of a first side LSR of a first inductor region IAR for the first inductor wire 20R is about 9 times the dimension of a second side SSR of the first inductor region IAR. The dimension of the first side LSL of a second inductor region IAL for the second inductor wire 20L is about 4.5 times the dimension of a second side SSL of the second inductor region IAL. Further, the dimension of the first side LSL of the second inductor region IAL is larger than the dimension of the first side LSR of the first inductor region IAR.

As illustrated in FIG. 22, when viewed from the thickness direction Td, the distance between the geometric center of the first pad 22R of the first inductor wire 20R and the geometric center of the first pad 22L of the second inductor wire 20L is equal to the pitch P1, and is about half the dimension of the element body BD in the short direction Wd. Therefore, the distance between the geometric center of the first pad 22R of the first inductor wire 20R and the geometric center of the first pad 22L of the second inductor wire 20L is one-third of the first side LSR of the first inductor region IAR.

A method of manufacturing the inductor component 10 according to the second embodiment will be described. In the method of manufacturing the inductor component 10 according to the second embodiment, points different from the method of manufacturing the inductor component 10 according to the first embodiment will be described below.

In the insulation layer processing step in the second embodiment, a solder resist functioning as the insulation layer 90 is patterned by photolithography on a portion, of the upper face of the second magnetic layer 55 and the upper face of each vertical wire, where the terminal portion 80 is not formed. In the present embodiment, the direction orthogonal to the upper face of the insulation layer 90, that is, the main face MF of the element body BD, is the thickness direction Td.

In the terminal portion processing step in the second embodiment, the first external terminal 81, the second external terminal 82, and the dummy portion 83 are formed in a portion, of the upper face of the second magnetic layer 55 and the upper face of each vertical wire, which is not covered with the insulation layer 90. These metal layers are formed by electroless plating for each of copper, nickel, and gold. As a result, the first external terminal 81, the second external terminal 82, and the dummy portion 83 having a three-layer structure are formed.

Figure 26:
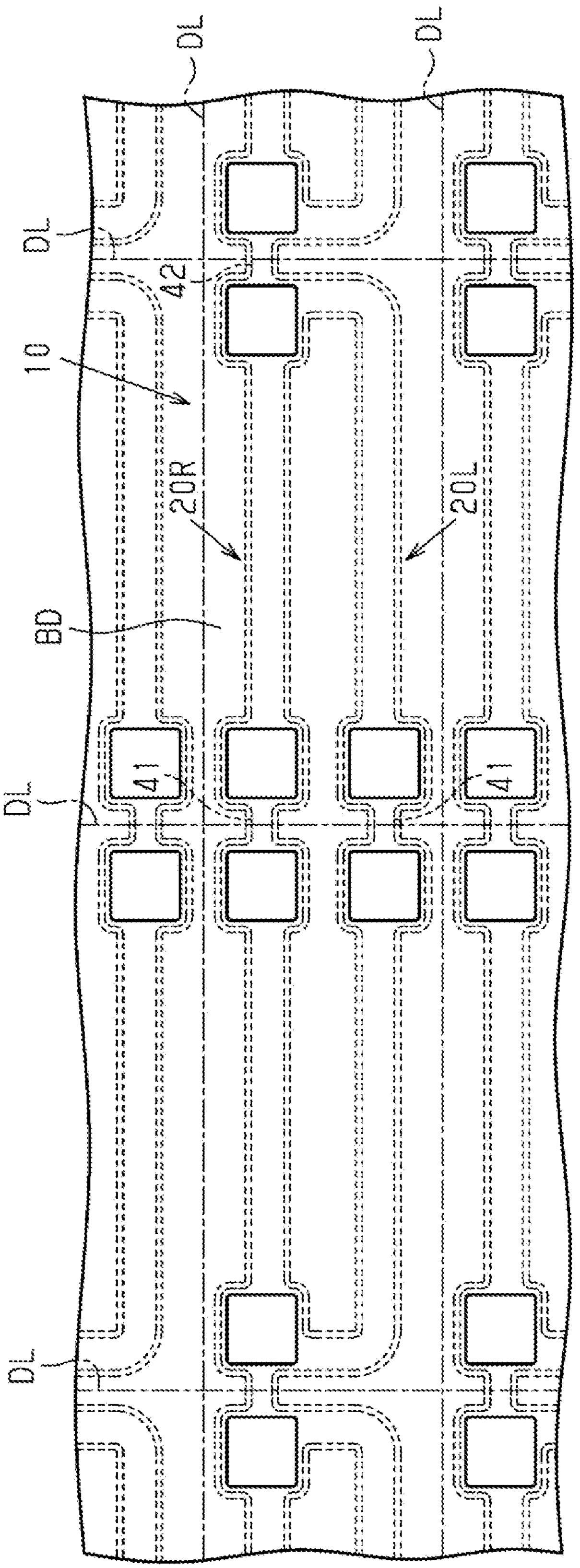
FIG. 26 is an explanatory diagram of the method of manufacturing the inductor component according to the second embodiment.

In the segmenting step according to the second embodiment, as illustrated in FIG. 26, segmentation is performed by cutting with a dicing machine at a break line DL. As a result, the inductor component 10 can be obtained.

In a state before cutting with a dicing machine, for example, as illustrated in FIG. 26, a plurality of inductor components is disposed in parallel in the longitudinal direction Ld and the short direction Wd, and the individual inductor components are connected by the element body BD, the first support wire 41, and the second support wire 42. Specifically, the first support wires 41 are connected to each other, and the second support wires 42 are connected to each other. By cutting the first support wire 41 and the second support wire 42 including the break line DL in the thickness direction Td, the cut face of the first support wire 41 is exposed from the first side face 93 as the exposed face 41A. The cut face of the second support wire 42 is exposed from the second side face 94 as the exposed face 42A.

Next, effects of the second embodiment will be described. In addition to the effects (1-1), (1-2), and (1-7) to (1-13) of the first embodiment described above, the inductor component 10 of the second embodiment further has the following effects.

(2-1) In the second embodiment, the first inductor wire 20R and the second inductor wire 20L are in contact with each other on the same plane. In this case, the dimension of the first side LSR of the first inductor region IAR for the first inductor wire 20R is three times or more the dimension of the second side SSR of the first inductor region IAR. Further, the dimension of the first side LSL of the second inductor region IAL for the second inductor wire 20L is three times or more the dimension of the second side SSL of the second inductor region IAL. Therefore, each of the wiring bodies 21 extends correspondingly in the longitudinal direction Ld. Therefore, it is possible to increase the inductance value obtained when the current flows through any of the inductor wires 20.

(2-2) In the second embodiment, the first side LSR of the first inductor region IAR is smaller than the first side LSL of the second inductor region IAL. According to the second embodiment, the distance between the geometric center of the first pad 22R of the first inductor wire 20R and the geometric center of the first pad 22L of the second inductor wire 20L is one-third of the first side LSR of the first inductor region IAR. Therefore, the first inductor wire 20R and the second inductor wire 20L are not disposed excessively away from each other in the short direction Wd. Therefore, it is possible to suppress the excessively large dimension of the element body BD in the short direction Wd.

(2-3) In the second embodiment, the wiring length of the first wiring body 21R is different from the wiring length of the second wiring body 21L. Therefore, the inductance value can be switched to a different inductance value depending on which of the first pad 22R and the first pad 22L the current flows to.

(2-4) In the second embodiment, the dummy portion 83 is provided in the fifth layer L5. When viewed from the thickness direction Td, the area of the dummy portion 83 is equal to that of the first external terminal 81 and the second external terminal 82. Therefore, when the dummy portion 83 is soldered to the substrate or the like in the same manner as the first external terminal 81 and the second external terminal 82, the amount of solder applied onto these four terminal portions 80 can be made uniform. Therefore, it is possible to prevent the inductor component 10 from being tilted and mounted on a substrate or the like.

Each of the above embodiments can be modified as follows. The above embodiments and the following modification examples can be implemented in combination with each other within a range not technically contradictory.

The dimension of the first side LS of the inductor region IA may be three times or more the dimension of the second side SS of the inductor region IA. As the dimension of the first side LS of the inductor region IA is larger than the dimension of the second side SS of the inductor region IA, the inductor wire 20 is easily extended in the first direction. From such a viewpoint, the dimension of the first side LS of the inductor region IA is more desirably five times or more the dimension of the second side SS of the inductor region IA.

When a plurality of inductor wires 20 are provided and there is a plurality of inductor regions IA, the dimension of the first side LS may be three times or more the dimension of the second side SS in at least one of the inductor regions IA.

In each of the above embodiments, the inductor wire may be any wire capable of imparting inductance to the inductor component 10 by generating a magnetic flux in the magnetic layer when a current flows. In each of the above embodiments, each of the inductor wires does not necessarily have to reduce the DC electric resistance as compared with a spiral inductor wire having the same wiring length.

Figure 27:
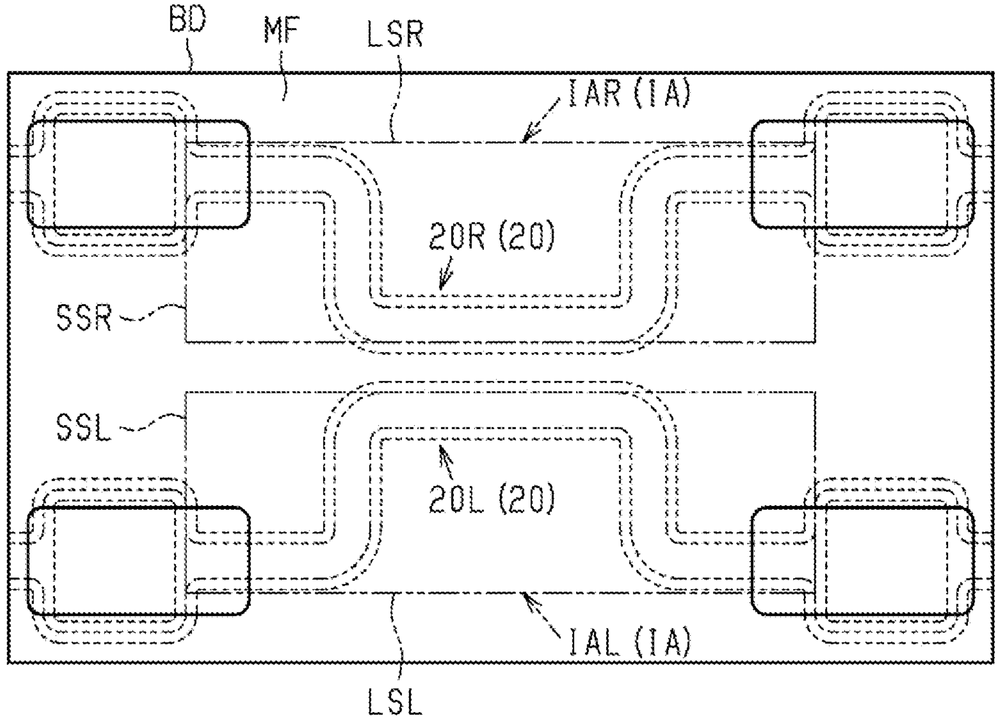
FIG. 27 is a transparent top view of an inductor component according to a modification example.

The shape of the inductor wire 20 is not limited to the example of each of the above embodiments. For example, in the example illustrated in FIG. 27, the first inductor wire 20R and the second inductor wire 20L have a meander shape. In this case, when the first side LSR of the first inductor region IAR for the first inductor wire 20R is three times or more the second side SSR of the first inductor region IAR, the wiring length of the first inductor wire 20R can be secured. The same applies to the second inductor wire 20L. In the example shown in FIG. 27, when viewed from the thickness direction Td, the dimension of the main face MF in the longitudinal direction Ld is less than 3 times the dimension of the main face MF in the short direction Wd. However, two inductor wires 20 are disposed side by side in the short direction Wd. The dimension of the main face MF in the longitudinal direction Ld is 2.5 times or more a value obtained by dividing the dimension of the main face MF in the short direction Wd by "2", which is the number of the inductor wires 20 disposed side by side in the short direction Wd.

For example, in the first embodiment, the inductor wire 20 may not be linear. In order to acquire a suitable inductance value at the time of use, a curved connection portion may be provided. A plurality of connection portions may be provided in the inductor wire 20. In the second embodiment, the first inductor wire 20R may not be linear, and a plurality of connection portions may be provided in the second inductor wire 20L.

Furthermore, for example, in a case where the plurality of inductor wires 20 is provided, the shapes of the plurality of inductor wires 20 may be different. In this case, the number of turns of each inductor wire 20 may be 0.5 turns or less.

In each of the above embodiments, the extension direction of the wiring body 21 may not coincide with the longitudinal direction Ld. For example, the extension direction of the wiring body 21 may be tilted with respect to the longitudinal direction Ld. However, when the extension direction of the wiring body 21 is tilted with respect to the longitudinal direction Ld, the extension direction of the first side LS of the inductor region IA is the same direction as the longitudinal direction Ld. Therefore, when the length of the wiring body 21 is the same, the size of the inductor region IA changes depending on the extension direction of the wiring body 21.

Figure 28:
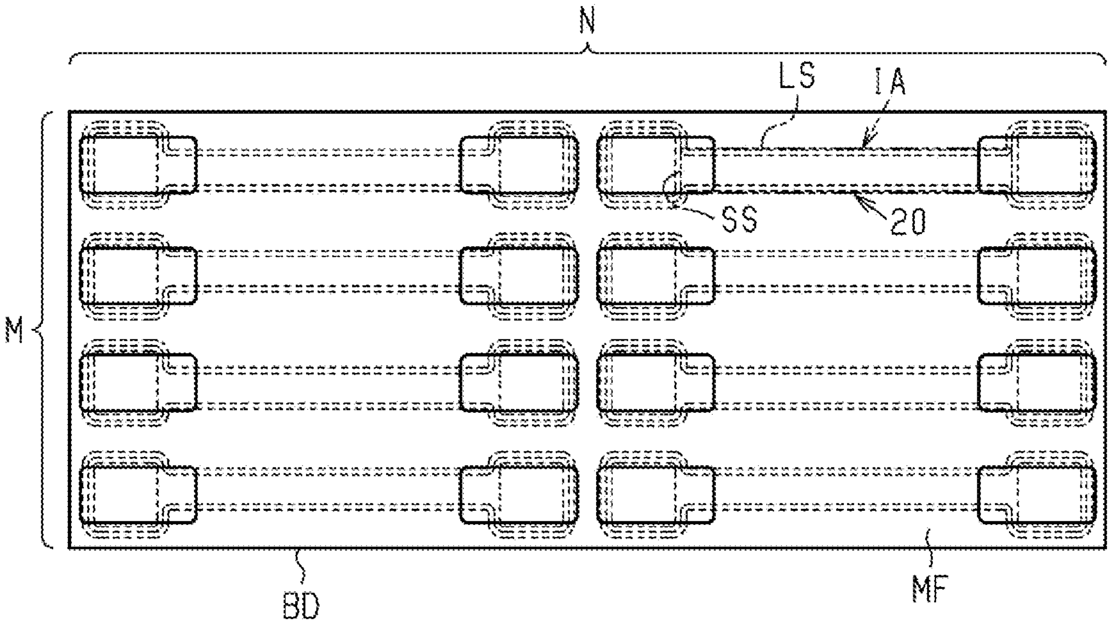
FIG. 28 is a transparent top view of an inductor component according to a modification example.
Figure 29:
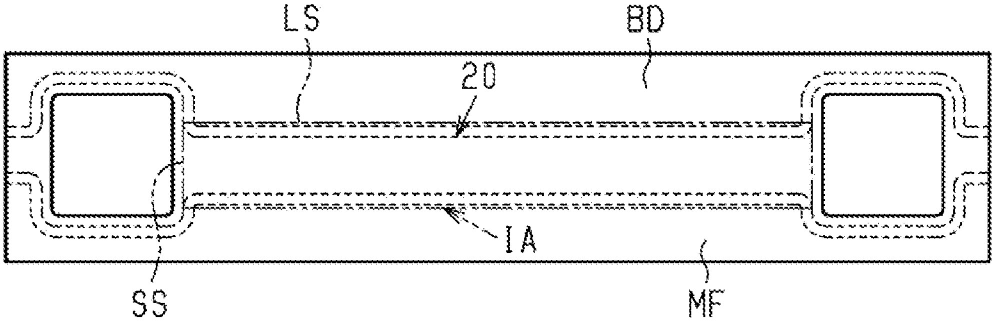
FIG. 29 is a transparent top view of an inductor component according to a modification example.

The number of the inductor wires 20 may be three or more, or may be one. For example, in the example illustrated in FIG. 28, eight inductor wires 20 are provided. The eight inductor wires 20 are away from each other on the same plane, and four rows of two inductor wires 20 disposed in the first direction are provided in the second direction. Furthermore, for example, in the example illustrated in FIG. 29, the number of inductor wires 20 is one.

A plurality of inductor wires 20 is provided, and N and M are positive integers. When the plurality of inductor wires 20 is away from each other on the same plane, and M rows of the N inductor wires 20 disposed in the first direction are provided in the second direction, the dimension of the main face MF in the longitudinal direction Ld may not be three times or more the dimension of the main face MF in the short direction Wd. In this case, when viewed from the thickness direction Td, the main face MF has a quadrangular shape, and when viewed from the thickness direction Td, a direction parallel to one side of the quadrangle is defined as a first direction, and a direction parallel to the main face MF and orthogonal to the first direction is defined as a second direction. The first direction coincides with the direction in which the long side of the rectangular inductor region IA extends. In this case, the value obtained by dividing the dimension of the main face MF in the first direction by N may be 2.5 times or more the value obtained by dividing the dimension of the main face MF in the second direction by M. For example, in the example illustrated in FIG. 28, N is "2" and M is "4". The value obtained by dividing the dimension of the main face MF in the first direction by "2" is 4.6 times the value obtained by dividing the dimension of the main face MF in the second direction by "4".

In the second embodiment, the distance between the geometric center of the first pad 22R of the first inductor wire 20R and the geometric center of the first pad 22L of the second inductor wire 20L may be larger than one-third of the first side LSR of the first inductor region IAR. The distance may be appropriately changed according to the shape of the inductor wire 20 and the size of the element body BD.

In each of the above embodiments, the dimension of the element body BD in the thickness direction Td is not limited to the example of each of the above embodiments. For example, the dimension of the element body BD in the thickness direction Td may be larger than the dimension of the element body BD in the short direction Wd. However, as described above, the smaller the dimension of the element body BD in the thickness direction Td, the smaller the dimension protruding from the substrate when the inductor component 10 is mounted on the substrate, which is preferable. Specifically, the dimension is preferably 0.25 mm or less.

In each of the above embodiments, the position of the first support wire 41 is not limited to the example of each of the above embodiments. For example, the position of the central axis line A1 of the first support wire 41 in the short direction Wd may be the same as the position of the central axis line C1 of the wiring body 21 of the connected inductor wire 20 in the short direction Wd. When the wiring body 21 includes a curved portion, the central axis line A1 of the first support wire may be shifted from the central axis line of the linear portion as long as the end portion of the wiring body 21 toward the pad side is linear.

In each of the above embodiments, the number of support wires exposed from the first side face 93 and the second side face 94 may be three or more or may be omitted depending on the number of inductor wires. In the example illustrated in FIG. 28, all the support wires are omitted.

In each of the above embodiments, the average grain diameter of the metal magnetic powder contained in the magnetic layer 50 is not limited to the example of each of the above embodiments. However, in order to ensure the relative permeability, the average grain diameter of the metal magnetic powder is preferably one micrometer or more and 10 micrometers or less (i.e., from one micrometer to 10 micrometers).

In each of the above embodiments, the metal magnetic powder included in the first magnetic layer 54 and the second magnetic layer 55 may not be the metal powder containing Fe. For example, the metal powder containing Ni or Cr may be used.

In each of the above embodiments, the minimum interval between the adjacent inductor wires may not be the interval between the pads, and may be the interval between the wiring bodies 21. However, from the viewpoint of insulation between the inductor wires 20, the minimum interval is preferably 50 micrometers or more. Furthermore, the interval of about 100 micrometers or more is more preferable.

In each of the above embodiments, the composition of each inductor wire 20 is not limited to the example of each of the above embodiments. For example, silver or gold may be used.

In each of the above embodiments, the composition of the magnetic layer 50 is not limited to the example of each of the above embodiments. For example, the magnetic layer 50 may be made of ferrite powder or a mixture of a ferrite powder and a metal magnetic powder.

In each of the above embodiments, another layer may be interposed between each of the support wires 41 and 42 and the magnetic layer 50. For example, an insulation layer may be interposed between each of the support wires 41 and 42 and the magnetic layer 50.

In each of the above embodiments, the first vertical wire 71 and the second vertical wire 72 may not extend only in the direction orthogonal to the main face MF. For example, when the first vertical wire 71 and the second vertical wire 72 are inclined with respect to the thickness direction Td, they may penetrate the second magnetic layer 55.

In each of the above embodiments, when viewed from the thickness direction Td, the areas of the first pad and the second pad may be equal to the areas of the first vertical wires 71 and the second vertical wires 72, respectively. In addition, the length dimensions of the first pad and the second pad in the direction orthogonal to the extension direction of the wiring body may be the same as that of the wiring body.

In each of the above embodiments, the first external terminal 81 and the second external terminal 82 may be omitted. When the first vertical wire 71 and the second vertical wire 72 are exposed from the main face MF, a current can flow directly from the first vertical wire 71 and the second vertical wire 72 to the inductor wire 20. In this case, a portion, of the first vertical wire 71, exposed from the main face MF and a portion, of the second vertical wire 72, exposed from the main face MF function as external terminals.

The metal layers of the first external terminal 81 and the second external terminal 82 may be nickel, gold, nickel, or tin. In addition, a catalyst layer may be provided as necessary. For example, as nickel can suppress electromigration, and gold or tin can ensure solder wettability, the metal layer of each external terminal can be appropriately set according to each function.

In each of the above embodiments, the outer faces of the first external terminal 81 and the second external terminal 82 may be covered with an insulation layer. In this case, in a state where the inductor component 10 before being mounted on a substrate or the like is stored, it is possible to prevent an unintended current from flowing inside the inductor component 10 through each external terminal. In the case of this modification example, before the inductor component 10 is mounted on a substrate or the like, cleaning or the like may be performed to remove the insulation layer covering the first external terminal 81 and the second external terminal 82.

In the second embodiment, the dummy portion 83 may not have the same laminated structure as the first external terminal 81 and the second external terminal 82. For example, the dummy portion 83 may not be a substance having conductivity. Furthermore, for example, the dummy portion 83 may be a portion where the second magnetic layer 55 is exposed from the insulation layer 90.

In the second embodiment, the area of the dummy portion 83 when viewed from the thickness direction Td may be different from the area of each of the first external terminal 81 and the second external terminal 82.

In the second embodiment, the dummy portion 83 may not be provided.

In each of the above embodiments, the method of manufacturing the inductor component 10 is not limited to the example of each of the above embodiments. For example, in the first embodiment and the second embodiment, the step of forming the inductor wire 20 and the step of forming the first support wire 41 and the second support wire may be different steps. For example, after the inductor wire 20 is formed, the support wires 41 and 42 may be formed of a material different from that of the inductor wire 20.

What is claimed is:

1. An inductor component comprising:

a rectangular parallelepiped element body having a rectangular main face;

at least one inductor wire that extends in parallel with the main face inside the element body and whose number of turns is 0.5 turns or less; and a first vertical wire and a second vertical wire extending from the inductor wire in a thickness direction orthogonal to the main face and exposed from the main face, wherein when a direction parallel to a long side of the main face is defined as a first direction, and a direction parallel to the main face and orthogonal to the first direction is defined as a second direction, the inductor wire includes a wiring body having a first end, a second end, and a central axis extending along the first direction, the first end being positioned closer to one side in the first direction than the second end, a first pad being provided at the first end of the wiring body and connected to the first vertical wire, and a second pad being provided at the second end of the wiring body and connected to the second vertical wire, wherein a first support wire extends from the first pad toward the first end in the first direction and has a first central axis extending along the first direction, a second support wire extends from the second pad toward the second end in the first direction, and has a second central axis extending along the first direction, the first central axis of the first support wire and the second central axis of the second support wire do not coincide with the central axis of the wiring body, the first pad has a first central axis extending along the first direction, and the first central axis of the first pad does not coincide with the central axis of the wiring body at a connection end between the first pad and the wiring body; and when a smallest rectangular region surrounding the wiring body when viewed from the thickness direction with a first side parallel to the first direction and a second side parallel to the second direction is defined as an inductor region, a dimension of the main face in the first direction is 2.5 times or more longer than a dimension of the main face in the second direction, and a dimension of the first side is 3 times or more longer than a dimension of the second side.

2. The inductor component according to claim 1, wherein a dimension of the element body in the thickness direction is smaller than a dimension of the element body in the second direction.

3. The inductor component according to claim 1, wherein the at least one inductor wire includes a first inductor wire and a second inductor wire, and the second pad of the first inductor wire and the second pad of the second inductor wire are an identical pad.

4. The inductor component according to claim 3, wherein the first pad of the first inductor wire and the first pad of the second inductor wire are disposed side by side in the second direction, and when viewed from the thickness direction, a distance between a geometric center of the first pad of the first inductor wire and a geometric center of the first pad of the second inductor wire is less than one-third of a smaller one of a dimension of a long side of the first inductor wire in the inductor region and a dimension of a long side of the second inductor wire in the inductor region.

5. The inductor component according to claim 1, wherein the dimension of the first side is five times or more longer than the dimension of the second side.

6. The inductor component according to claim 1, wherein the wiring body has a linear shape.

7. The inductor component according to claim 6, wherein an extension direction of the wiring body coincides with the first direction.

8. The inductor component according to claim 1, wherein a dimension of the element body in the thickness direction is 0.25 mm or less.

9. The inductor component according to claim 1, wherein the element body includes a magnetic layer, and at least part of the inductor wire is covered with the magnetic layer.

10. The inductor component according to claim 2, wherein the at least one inductor wire includes a first inductor wire and a second inductor wire, and the second pad of the first inductor wire and the second pad of the second inductor wire are an identical pad.

11. The inductor component according to claim 2, wherein the dimension of the first side is five times or more longer than the dimension of the second side.

12. The inductor component according to claim 1, wherein the second pad has a second central axis extending along the first direction, and the second central axis of the second pad does not coincide with the central axis of the wiring body at a connection end between the second pad and the wiring body.

13. The inductor component according to claim 1, wherein in the thickness direction, a thickness of the first support wire equals a thickness of the first pad.

14. The inductor component according to claim 1, wherein a top surface of the wiring body, a top surface of the first pad, and a top surface of the first support wire are coplanar with each other.

15. An inductor component comprising:

a rectangular parallelepiped element body having a rectangular main face;

a plurality of inductor wires that extend in parallel with the main face inside the element body and whose number of turns is 0.5 turns or less; and a first vertical wire and a second vertical wire extending from each of the inductor wires in a thickness direction orthogonal to the main face and exposed from the main face, wherein when a direction parallel to one side of the main face is defined as a first direction, and a direction parallel to the main face and orthogonal to the first direction is defined as a second direction, each of the inductor wires includes a wiring body having a first end, a second end, and a central axis extending along the first direction, the first end being positioned closer to one side in the first direction than the second end, a first pad being provided at the first end of the wiring body and connected to the first vertical wire, and a second pad being provided at the second end of the wiring body and connected to the second vertical wire, wherein a first support wire extends from the first pad toward the first end in the first direction and has a first central axis extending along the first direction, a second support wire extends from the second pad toward the second end in the first direction, and has a second central axis extending along the first direction, the first central axis of the first support wire and the second central axis of the second support wire do not coincide with the central axis of the wiring body, the first pads have a first central axis extending along the first direction, and the first central axis of the first pads does not coincide with the central axis of the wiring body at a connection end between the first pads and the wiring body;

when N and M are positive integers, at least one of N and M is a positive integer of 2 or more, the inductor wires are away from each other on an identical plane, N of the inductor wires are disposed in the first direction in one row, and M rows of the inductor wires are provided in the second direction;

when the main face is imaginarily divided into N ranges at equal intervals in the first direction and is imaginarily divided into M ranges at equal intervals in the second direction, one of the inductor wires is disposed in one range when viewed from the thickness direction;

when a smallest rectangular region surrounding the wiring body with a first side parallel to the first direction and a second side parallel to the second direction when viewed from the thickness direction is defined as an inductor region, a dimension of the first side is three times or more longer than a dimension of the second side in at least one of the inductor regions; and a value obtained by dividing a dimension of the main face in the first direction by N is 2.5 times or more larger than a value obtained by dividing a dimension of the main face in the second direction by M.

16. The inductor component according to claim 15, wherein a dimension of the element body in the thickness direction is smaller than a value obtained by dividing the dimension of the main face in the second direction by M.

17. The inductor component according to claim 15, wherein

M is an integer of 2 or more, and a distance in the second direction between geometric centers of the first pads adjacent to each other in the second direction is less than one-third a dimension of the first side of at least one of the inductor regions.

18. The inductor component according to claim 15, wherein a shape of at least one inductor wire of the plurality of inductor wires is different from a shape of an other inductor wire disposed adjacent to the at least one inductor wire.

19. The inductor component according to claim 15, wherein the dimension of the first side is five times or more longer than the dimension of the second side in at least one of the inductor regions.

20. The inductor component according to claim 15, wherein the second pads have a second central axis extending along the first direction, and the second central axis of the second pads does not coincide with the central axis of the wiring body at a connection end between the second pads and the wiring body.

21. The inductor component according to claim 15, wherein in the thickness direction, a thickness of the first support wire equals a thickness of the first pads.

22. The inductor component according to claim 15, wherein a top surface of the wiring body, a top surface of the first pads, and a top surface of the first support wire are coplanar with each other.

* * * * *